US008918464B1

(12) United States Patent
Mei et al.

(10) Patent No.: US 8,918,464 B1
(45) Date of Patent: Dec. 23, 2014

(54) SYSTEMS AND METHODS FOR ASSIGNING CONFERENCE ATTENDEES AMONG MULTIPLE CONFERENCE SERVERS PRIOR TO A CONFERENCE EVENT

(71) Applicants: Zhu-Song Mei, Chicago, IL (US); Justin Matthew Brown, Chicago, IL (US)

(72) Inventors: Zhu-Song Mei, Chicago, IL (US); Justin Matthew Brown, Chicago, IL (US)

(73) Assignee: BigMarker.com, LLC, Chicago, IL (US)

( * ) Notice: Subject to any disclaimer, the term of this patent is extended or adjusted under 35 U.S.C. 154(b) by 0 days.

(21) Appl. No.: 13/781,714

(22) Filed: Feb. 28, 2013

Related U.S. Application Data

(60) Provisional application No. 61/604,441, filed on Feb. 28, 2012.

(51) Int. Cl.
| | |
|---|---|
| *G06F 15/16* | (2006.01) |
| *G06F 3/00* | (2006.01) |
| *H04L 12/16* | (2006.01) |
| *H04L 29/06* | (2006.01) |
| *H04L 12/18* | (2006.01) |
| *H04M 3/56* | (2006.01) |

(52) U.S. Cl.
CPC .......... *H04L 65/403* (2013.01); *H04L 12/1818* (2013.01); *H04M 3/56* (2013.01)
USPC ............................ 709/204; 715/753; 370/261

(58) Field of Classification Search
CPC ............ H04L 12/1818; H04L 12/1822; H04L 12/1827; H04L 65/403; H04M 3/56; H04M 3/567
USPC ............................ 709/204; 715/753; 370/261
See application file for complete search history.

(56) References Cited

U.S. PATENT DOCUMENTS

| | | | | |
|---|---|---|---|---|
| 8,107,402 | B1* | 1/2012 | Everson et al. | 370/260 |
| 2005/0021531 | A1* | 1/2005 | Wen et al. | 707/100 |
| 2008/0077665 | A1* | 3/2008 | Sekaran et al. | 709/204 |
| 2008/0112338 | A1* | 5/2008 | Acharya et al. | 370/261 |
| 2010/0094939 | A1* | 4/2010 | Cheng et al. | 709/206 |
| 2010/0169789 | A1* | 7/2010 | Cheng et al. | 715/738 |
| 2011/0069642 | A1* | 3/2011 | Karam et al. | 370/260 |
| 2012/0084188 | A1* | 4/2012 | Zuber | 705/34 |
| 2013/0108033 | A1* | 5/2013 | Buzdugan | 379/202.01 |
| 2013/0111467 | A1* | 5/2013 | Sundararaj | 717/176 |

\* cited by examiner

*Primary Examiner* — Jeong S Park
(74) *Attorney, Agent, or Firm* — Troutman Sanders LLP; James E. Schutz; Jay R. Anderson, Jr.

(57) ABSTRACT

A method, device, system or article of manufacture is provided for social networking. In one embodiment, a method comprises hosting, by a master server, a plurality of client devices for a conference event, wherein each of the plurality of client devices is associated with a member of a community, wherein the master server is associated with a first computer program running on a first computer hardware system; identifying that a capacity of the master server is not sufficient to host the conference event; initiating, in response to identifying that the capacity of the master server is not sufficient for hosting the conference event, a secondary server, wherein the secondary server is associated with a second computer program running on a second computer hardware system; and assigning a portion of the plurality of client devices to the secondary server.

20 Claims, 18 Drawing Sheets

SYSTEMS AND METHODS FOR ASSIGNING CONFERENCE ATTENDEES AMONG MULTIPLE CONFERENCE SERVERS PRIOR TO A CONFERENCE EVENT

CROSS-REFERENCE TO RELATED APPLICATIONS

This application claims the priority benefit of U.S. Provisional Application Ser. No. 61/604,441, filed on Feb. 28, 2012, titled "Social Networking System," the contents of which are hereby incorporated by reference as if fully set forth below.

FIELD OF USE

The present disclosure relates generally to communications, and more specifically, to systems and methods of social networking.

BACKGROUND

A conference event is typically provided by a conferencing system and used to allow a host to have one or more individuals participate in an event. The conference event may allow the individuals to actively participate during the event, or may only allow the individuals to passively participate by merely listening or viewing the event. While conference events are typically used for business activities, conference events can be used for social networking, including professional networking Social networking has become a supplemental form of communication between individuals and communities. Many different forms of social networking use text, voice, video, or avatars to facilitate web and mobile-based communication, including instant messaging, image sharing, e-mail, voice over Internet protocol (VoIP), Internet forums, blogs, wikis, podcasts, video, social bookmarking, wall postings, music sharing, and other forms. For example, individuals can participate in web-based collaborative projects such as Wikipedia®, blogs such as Twitter®, content communities such as YouTube®, social networking such as Facebook® and LinkedIn®, virtual game worlds such as World of Warcraft®, and others. Existing conferencing technologies range from real-time instant messaging to multipoint conferencing and allow on-line users to share ideas, activities, events, and interests within their individual networks. However, the existing technologies are not cost effective and do not allow the simultaneous sharing of text, voice, video, and avatars using real-time multipoint conferencing for social networking. Further, the existing technologies typically use a pre-pay, fixed-fee, or per-use billing method.

SUMMARY OF THE DISCLOSURE

The subject technology relates to methods, devices, and systems for social networking. In one embodiment, a master server may be configured to host a plurality of client devices for a conference event. Each of the plurality of client devices may be associated with a member of a community. Further, the master server may be associated with a first computer program running on a first computer hardware system. The master server may be configured to identify that its capacity is not sufficient to host the conference event. In response to identifying that the its capacity is not sufficient for hosting the conference event, the master server may be configured to initiate a secondary server. The secondary server may be associated with a second computer program running on a second computer hardware system. Finally, the master server may assign a portion of the plurality of client devices to the secondary server.

BRIEF DESCRIPTION OF THE DRAWINGS

The present disclosure is illustrated by way of examples, embodiments and the like and is not limited by the accompanying figures, in which like reference numbers may indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

The following detailed description is merely illustrative in nature and is not intended to limit the present disclosure, or the application and uses of the present disclosure. Furthermore, there is no intention to be bound by any expressed or implied theory presented in the preceding technical field, background, or the following detailed description. The present disclosure provides various examples, embodiments and the like, which may be described herein in terms of functional or logical block elements. It should be recognized that such block elements may be realized by any number of hardware, software, and/or firmware elements configured to perform the specified function. Various techniques described herein can be used for various social networking systems. The various aspects described herein are presented as methods, devices (or apparatus), and systems that can include a number of components, elements, members, modules, nodes, peripherals, or the like. Further, these methods, devices, and systems can include or not include additional components, elements, members, modules, nodes, peripherals, or the like.

Throughout the specification and the claims, the following terms take at least the meanings explicitly associated herein, unless the context clearly dictates otherwise. The term "connected" means that one feature, function, or element is directly joined to or in communication with another feature, function, or element. The term "coupled" means that one feature, function, or element is directly or indirectly joined to or in communication with another feature, function, or element. Relational terms such as "first" and "second," and the like may be used solely to distinguish one entity or action from another entity or action without necessarily requiring or implying any actual such relationship or order between such entities or actions. The term "or" is intended to mean an inclusive "or" rather than an exclusive "or." Further, the terms "a," "an," and "the" are intended to mean one or more unless specified otherwise or clear from the context to be directed to a singular form.

Figure 1:
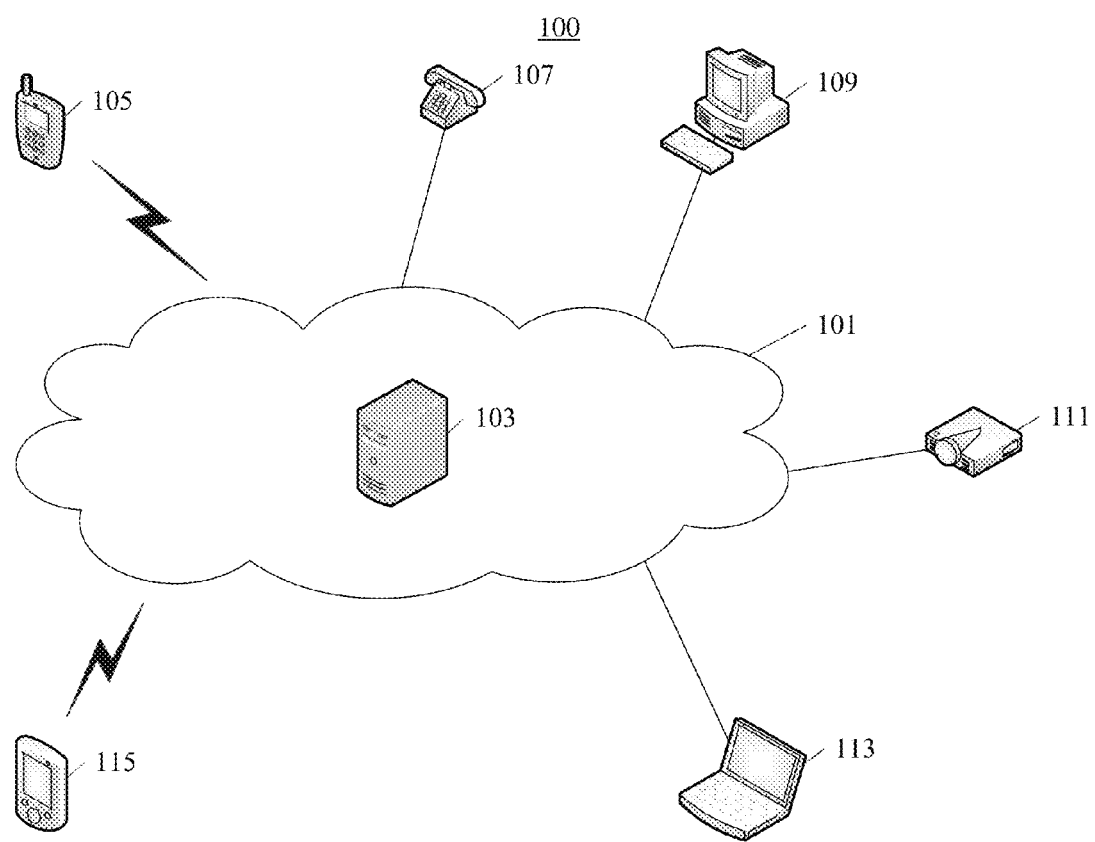
FIG. 1 illustrates one embodiment of a conferencing system in accordance with various aspects set forth herein.

It is desirable to have a social networking system that is cost effective and allows the simultaneous sharing of text, voice, video, and avatars using real-time multipoint conferencing. Furthermore, other desirable features and characteristics of the present disclosure will become apparent from the subsequent detailed description and claims, taken in conjunction with the accompanying figures and the foregoing technical field and background. FIG. 1 illustrates one embodiment of a conferencing system 100 in accordance with various aspects set forth herein. In FIG. 1, the conferencing system 100 can include a network 101, a server 103, and various client devices. A client device can be a wireless device 105, a plain old telephone service (POTS) device 107, a computer 109, a projector 111, a portable computer 113, a smartphone 115, other device, or any combination thereof. The network 101 can include a local area network (LAN), a wireless local area network (WLAN) such as wireless fidelity (WiFi) and worldwide interoperability for microwave access (WiMax), a wide area network (WAN), a wireless communication network such as the global system for mobile communication (GSM), code division multiple access (CDMA), universal mobile telephone system (UMTS), third generation (3G) cellular systems, fourth generation (4G) cellular systems, the Internet, a public switched telephone network (PSTN), other network, or any combination thereof.

In FIG. 1, the server 103 can include a computer program running on a computer hardware system that provides the conference event. In another embodiment, a server can be a client device. Further, the server 103 can serve the requests of a client program, wherein the client program can either run on the same computer hardware system or connect via the network from, for instance, a client device. The wireless device 105 used in the network 101 such as a wireless communication network may also be referred to as a mobile station (MS), a terminal, a cellular phone, a cellular handset, a personal digital assistant (PDA), a tablet computer, a wireless appliance, or some other equivalent terminology. The client device can be configured to include a microphone, a speaker, a video camera, a keyboard, a mouse, a display, other input device, other display device, or any combination thereof to allow the client device to be used to communicate voice, video, an avatar, a text message, a desktop capture, an electronic presentation, other similar communication, or any combination thereof with the server 103 via the network 101.

Figure 2:
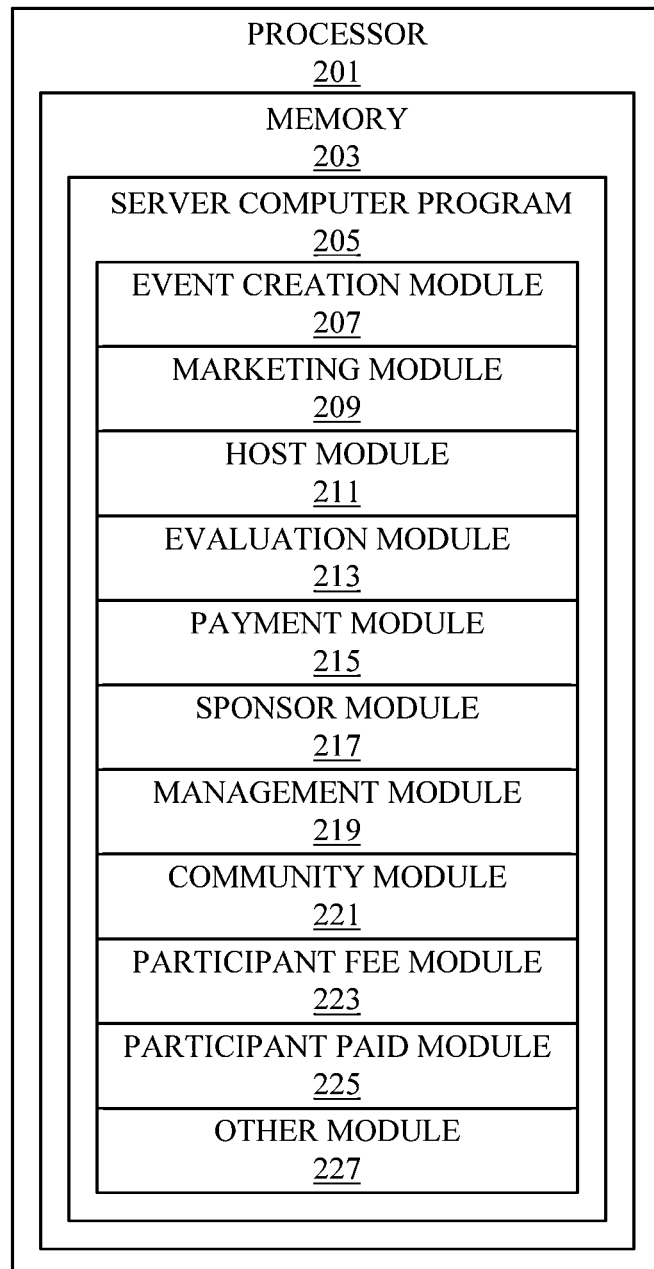
FIG. 2 illustrates one embodiment of a server computer structure for providing a conference event in accordance with various aspects set forth herein.

FIG. 2 illustrates one embodiment of a server computer structure 200 for providing a conference event in accordance with various aspects set forth herein. In FIG. 2, the structure 200 can be configured to include a processor 201 coupled to a memory 203, wherein the memory 203 can include a server computer program 205 for providing a conference event. The server computer program 205 can be configured to provide a conference event by communicating with a client device via a web page, an applet, a voice message, a text message, an e-mail, or any combination thereof. Further, the server computer program 205 can be configured to host the conference event for one or more client devices using, for instance, voice, video, an avatar, a text message, a desktop capture, an electronic presentation, other similar communication, or any combination thereof. The server computer program 205 can be configured to include an event creation module 207, a marketing module 209, a host module 211, an evaluation module 213, a payment module 215, a sponsor module 217, a management module 219, a community module 221, a participant fee module 223, a participant paid module 225, and another module 227. The event creation module 207 can be configured to define the type of conference event, provide a description of the conference event, select a date or time for the conference event, set a participant criteria, set a task for the participants to complete, other similar function, or any combination thereof. The marketing module 209 can be configured to market the conference event by, for instance, allowing the conference event to be posted to social networking sites such as Facebook®, Twitter® and LinkedIn®, distributed using e-mail, advertised using banner ads, other similar marketing techniques, or any combination thereof. The host module 211 can be configured to host the conference event by establishing communications between the participants using, for instance, voice, video, an avatar, a text message, a desktop capture, an electronic presentation, other similar communication, or any combination thereof. The evaluation module 213 can be configured to receive and evaluate a participant evaluation completed by the participants of a conference event.

In this embodiment, the payment module 215 can be configured to make, receive, process, or verify a payment via a check, a wire transfer, a credit card transaction such as Visa®, an online payment service such as PayPal®, another payment method, or any combination thereof. The sponsor module 217 can be configured to create, delete, set, process, or manage a fee to be paid by a sponsor of the conference event, receive a fee from a sponsor, other function, or any combination thereof. The management module 219 can be configured to, for instance, manage the structure 200, initiate a secondary server, remove a secondary server, remotely manage a secondary server, other function, or combination of functions. In one definition, a secondary server can be used to offload a function from a master server such as hosting all or a portion of the participants for a conference event. The community module 221 can be configured to create, delete, set, process, or manage a community for the conference event. The participant fee module 223 can be configured to create, delete, set, process, or manage a fee to be paid by each participant of the conference event. The participant paid module 225 can be configured to create, delete, set, process, or manage a fee to be paid to each participant of the conference event. The other module 227 can be configured to be used to support any of the other modules in the server computer program 205.

Figure 3:
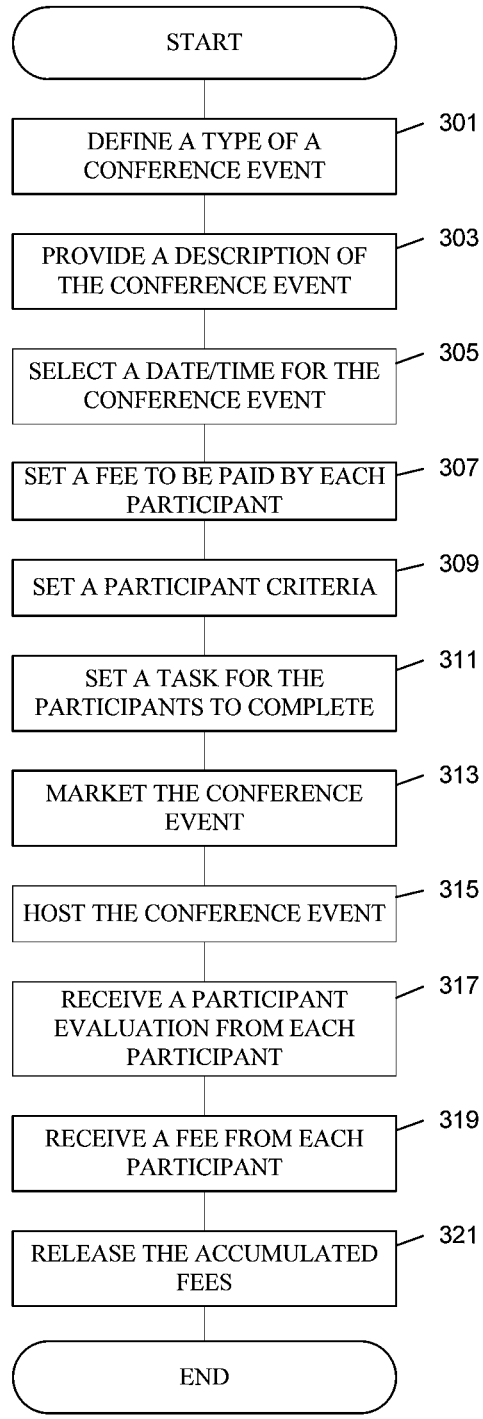
FIG. 3 is a flowchart illustrating one embodiment of a method of providing a conference event in accordance with various aspects set forth herein.

FIG. 3 is a flowchart illustrating one embodiment of a method 300 of providing a conference event in accordance with various aspects set forth herein. In FIG. 3, the method 300 can start at, for instance, block 301, where the method 300 can define a type of conference event. The type of conference event can be defined using a server via a web page, an applet, a voice message, a text message, an e-mail, or any combination thereof. The type of conference event can include whether the conference event is open to the public, open to a specific class of participants, or private by invitation only. In one example, a user selects an open to the public selection element on a web page hosted by a server, wherein the server is configured to obtain and process such selection element from the web page. In another example, a user sends an open to members only selection element to a server using an e-mail, wherein the server is configured to obtain and process such selection element from the e-mail. In another example, a user inputs a private by invite only selection element using an applet executing on a client device, wherein the server is configured to obtain and process such selection element sent by the applet. Further, the type of conference event can include whether the conference event allows some, none, or all of the participants to be a moderator. For example, a user selects a selection element to allow all participants to be a moderator on a web page hosted by a server, wherein the server is configured to obtain and process such selection element from the web page. In another example, a user sends to a server using an e-mail a selection element to allow only members of a club to be a moderator, wherein the server is configured to obtain and process such selection element from the e-mail. In another example, a user sends to a server using an applet a selection element to allow only a presenter to be a moderator, wherein the server is configured to obtain and process such selection element sent by the applet.

In FIG. 3, at block 303, the method 300 can provide a description of the conference event by, for instance, uploading an image file of the conference event, providing a title of the conference event, providing a description of the conference event, or any combination thereof. A user can provide the image, title, description, or any combination thereof to a server via a web page, an applet, a voice message, a text message, an e-mail, or any combination thereof. The image can be used to, for instance, allow potential participants to identify the conference event or further market the conference event. In one example, a user uploads an image file to a server using a web page hosted by the server, wherein the server is configured to obtain and process the image file from the web page. In another example, a user uploads an image file to a server using an e-mail, wherein the server is configured to obtain the e-mail and process the image file from the e-mail. In another example, a user uploads an image file to a server via an applet executing on a client device, wherein the server is configured to obtain and process the image file sent by the applet.

Further, the title can be used to identify the conference event. In one example, a user inputs the title into a title element on a web page hosted by a server, wherein the server is configured to obtain and process the title element from the web page. In another example, a user enters the title into a title element in an e-mail and sends the e-mail to a server, wherein the server is configured to obtain the e-mail and process the title element from the e-mail. In another example, a user enters the title into a title element of an applet executing on a client device, wherein a server is configured to obtain and process the title element sent by the applet. Also, a user can provide a description of the conference event. In one example, a user enters a description into a description element on a web page hosted by a server, wherein the server is configured to obtain and process the description element from such web page. In another example, a user enters a description into a description element of an e-mail and sends the e-mail to a server, wherein the server is configured to obtain the e-mail and process the description element from the e-mail. In another example, a user enters a description into a description element of an applet executing on a client device, wherein a server is configured to obtain and processes the description element sent by the applet.

At block 305, the method 300 can set a date or time for the conference event using a server via a web page, an applet, a voice message, a text message, an e-mail, or any combination thereof. In one example, a user sets the date or time of the conference event by entering the date or time into a date or time element on a web page hosted by the server, wherein the server is configured to obtain and process the date or time element from the web page. In another example, a user sends a date or time element to a server using an e-mail, wherein the server is configured to obtain the e-mail and process the date or time element from the e-mail. In another example, a user inputs the date or time into a date or time element of an applet executing on a client device, wherein a server is configured to obtain and process the date or time element sent by the applet.

At block 307, the method 300 can set a fee to be paid by each participant, an attendance budget, an attendance limit, or any combination thereof for a conference event using a server via a web page, an applet, a voice message, a text message, an e-mail, or any combination thereof. The fee to be paid by each participant can be set for all participants or for a class of participants. In one example, a user sets the fee to be paid by each participant of a conference event by entering an amount into a participant fee element on a web page hosted by a server, wherein the server is configured to obtain and process the participant fee element from the web page. In another example, a user sets the fee to be paid by each participant of a conference event by entering an amount into a ticket price element of an e-mail and sending the e-mail to a server, wherein the server is configured to obtain the e-mail and process the ticket price element from the e-mail. In another example, a user inputs a fee to be paid by each participant of a conference event by entering the fee into a participant fee element of an applet executing on a client device, wherein a server is configured to obtain and process the participant fee element sent by the applet. In another example, a user sets a first fee for a first class of participants such as members of a community and sets a second fee for a second class of participants such as non-members of the community. In another example, a user does not charge a fee for a first class of participants such as members of a community and sets a fee for a second class of participants such as non-members of the community.

Further, the method 300 can set an attendance limit for a conference event using a server via a web page, an applet, a voice message, a text message, an e-mail, or any combination thereof. A user can set the attendance limit for a conference event by setting, for instance, a minimum required number of participants registered for the conference event to allow the conference event to occur. In one example, a user sets the attendance limit of a conference event by entering a minimum required number of participants such as twenty participants into an attendance limit element on a web page hosted by a server, wherein the server is configured to obtain and process the attendance limit element from the web page. In another example, a user sets the attendance limit for the conference event by entering a minimum required number of participants into an attendance limit element of an e-mail and sending the e-mail to a server, wherein the server is configured to obtain the e-mail and process the attendance limit element from the e-mail. In another example, a user inputs the attendance limit for the conference event by entering a minimum required number of participants into an attendance limit element of an applet executing on a client device, wherein a server is configured to obtain and process the attendance limit element sent by the applet.

In addition, the method 300 can set an attendance budget for a conference event using a server via a web page, an applet, a voice message, a text message, an e-mail, or any combination thereof. A user can set the attendance budget for a conference event by setting, for instance, a minimum required amount of revenues for the conference event to allow it to occur. In one example, a user sets an attendance budget of a conference event by entering a minimum required amount of revenues into an attendance budget element on a web page hosted by a server, wherein the server is configured to obtain and process the attendance budget element from the web page. In another example, a user sets the attendance budget for the conference event by entering a minimum required amount of revenues into an attendance budget element of an e-mail and sending the e-mail to a server, wherein the server is configured to obtain the e-mail and process the attendance budget element from the e-mail. In another example, a user inputs the attendance budget for the conference event by entering a minimum required amount of revenues into an attendance budget element of an applet executing on a client device, wherein a server is configured to obtain and process the attendance budget element sent by the applet.

At block 309, the method 300 can set a participant criteria for the conference event using a server via a web page, an applet, a voice message, a text message, an e-mail, or any combination thereof. The participant criteria can be, for instance, a language the conference event will be conducted in, a profession the conference event is targeted towards, or any other demographics or combination of demographics. In one example, a user sets the participant criteria for the conference event by selecting the English language selection element on a web page hosted by the server, wherein the server is configured to obtain and process the selection element from the web page. In another example, a user sets the participant criteria for the conference event by identifying that the conference event is targeted towards accountants using a participant criteria element in an e-mail and sending the e-mail to a server, wherein the server is configured to obtain the e-mail and process the participant criteria element from the e-mail. In another example, a user inputs the participant criteria for the conference event by entering a keyword tag to allow a prospective participant to identify the conference event using an applet executing on a client device, wherein a server is configured to obtain and process the keyword tag sent by the applet.

At block 311, the method 300 can set a task for the participants to complete. A user can recommend or require the completion of certain tasks by each participant prior to, contemporaneous with, or after the conference event using a server via a web page, an applet, a voice message, a text message, an e-mail, or any combination thereof. In one example, a user recommends that each participant reads a specific document in preparation of the conference event. In another example, a user requires the participants to complete a participant evaluation after the conference event, wherein a server receives the participant evaluation from the user prior to or contemporaneous with the conference event, provides the participant evaluation to the participants contemporaneous with or after the conference event, and receives the completed participant evaluations from the participants contemporaneous with or after the conference event. In another example, a user requires the participants to answer questions during the conference event using an applet executing on a client device, wherein a server is configured to receive the questions from the user prior to or contemporaneous with the conference event, provide the questions to the applet contemporaneous with the conference event, and to obtain and process the answers to the questions from the applet contemporaneous with or after the event.

At block 313, the method 300 can market the conference event by, for instance, allowing the conference event to be posted to social networking sites such as Facebook®, Twitter® and LinkedIn®, distributed using e-mail, advertised using banner ads, other similar marketing techniques, or any combination thereof. Further, the marketing of the conference event can use keyword tags to identify prospective participants such as correlating the keyword tags with the likes or dislikes of each prospective participant. Also, the marketing of the conference event can use the conference event histories of prospective participants for targeted e-mail advertisements. For example, a user markets a conference event by using a hypertext link on a web page hosted by a server, wherein the server is configured to use the hypertext link to post the conference event on his or her Facebook® web page or LinkedIn® web page. In another example, a user can enter a keyword tag associated with the conference event on a web page hosted by a server, wherein the server is configured to use the keyword tag to identify a prospective participant using his or her profile information. Once a prospective participant is identified, the server can send an e-mail to the prospective participant notifying him or her of the conference event.

At block 315, the method 300 can host the conference event by establishing communications between the participants using, for instance, voice, video, an avatar, a text message, a desktop capture, an electronic presentation, other similar communication, or any combination thereof. The voice can be captured by a microphone, converted to a digital voice signal, and sent to a server. The server can process the digital voice signal to improve its quality, change its data rate, other similar function, or any combination thereof. Further, the server can deliver the digital voice signal to other participants. In one example, the server can filter the digital voice signal to improve the quality of the audio. In another example, the server can change the data rate of the digital voice signal to conform to the data bandwidth constraints of the target listener. Similarly, the video can be captured by a camera, converted to a digital video signal, and sent to a server. The server can process the digital video signal to improve its quality, change its data rate, other similar function, or any combination thereof. For example, the server can change the frame rate of the digital video signal to conform to the data bandwidth constraints of the target viewer. In another example, the server can change the frame size of the digital video signal to conform to the data bandwidth constraints of the target viewer. The audio and video can be compressed using, for instance, the moving picture experts group (MPEG)-2 standard, MPEG-4 standard, H.263 standard, H.264 standard, other similar standards, or any combination thereof. In one example, the audio and the video is compressed using MPEG-4.

At block 317, the method 300 can receive a participant evaluation from each participant of the conference event. A user can provide the participant evaluation to a server via a web page, an applet, a voice message, a text message, an e-mail, or any combination thereof prior to, contemporaneous with, or after the conference event. In one example, a user uploads a participant evaluation form to a server using a web page hosted by the server, wherein the server is configured to process the participant evaluation form from obtain and process the participant evaluation form from the web page. In another example, a user sends a participant evaluation form to a server using an e-mail, wherein the server is configured to obtain the e-mail and process the participant evaluation form from the e-mail. In another example, a user sends a participant evaluation form to a server using an applet running on a client device, wherein the server is configured to obtain and process the participant evaluation form sent by the applet. The participant evaluation can be used to determine whether a registered participant participated in the conference event. A participant can receive the participant evaluation of a conference event from a server via a web page, an applet, a voice message, a text message, an e-mail, or any combination thereof prior to, contemporaneous with, or after the conference event. In one example, a participant completes the participant evaluation form on a web page hosted by a server, wherein the server is configured to obtain and process the completed participant evaluation form from the web page. In another example, a participant receives the participant evaluation form from a server using an e-mail, wherein the server is configured to obtain the e-mail and process the completed participant evaluation form from the e-mail. In another example, a participant receives the participant evaluation form from a server using an applet running on a client device, wherein the server is configured to obtain and process the completed participant evaluation form sent by the applet.

At block 319, the method 300 can receive a fee from each participant. The fee from each participant can be paid prior to, contemporaneous with, or after the conference event. The fee can be paid via a check, a wire transfer, a credit card transaction such as Visa®, an online payment service such as PayPal®, another payment method, or any combination thereof. Further, notice of the fee payment can be provided electronically to a server. Also, a server can monitor an account such as a PayPal® account for any payments. For example, a server can receive a notice of a participant fee via PayPal®.

At block 321, the method 300 can release to a host, an organizer, a sponsor, a presenter, a community, a charity, an organization, an individual, or any combination thereof the accumulated fees paid by the participants. Further, the accumulated fees can be released by a server after, for instance, a certain period of time, review of the participant evaluations, other method, or combination of methods. For example, the accumulated fees can be released to the organizer of the conference event after 30 days. The accumulated fees can be released by a server via a check, a wire transfer, a credit card transaction such as Visa®, an online payment service such as PayPal®, another payment method, or any combination thereof. For example, a server can be configured to release the accumulated fees to a host account using PayPal®.

Figure 4:
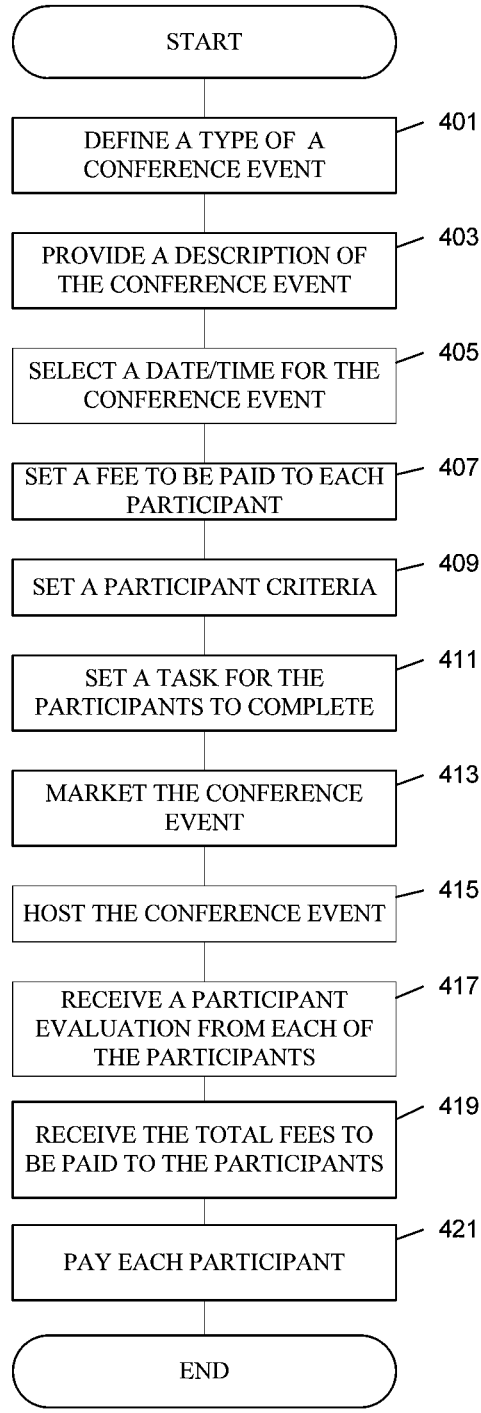
FIG. 4 is a flowchart illustrating another embodiment of a method of providing a conference event in accordance with various aspects set forth herein.

FIG. 4 is a flowchart illustrating another embodiment of a method 400 of providing a conference event in accordance with various aspects set forth herein. FIG. 4 is a flowchart illustrating one embodiment of a method 400 of providing a conference event in accordance with various aspects set forth herein. In FIG. 4, the method 400 can start at, for instance, block 401, where the method 400 can define a type of conference event. The type of conference event can be defined using a server via a web page, an applet, a voice message, a text message, an e-mail, or any combination thereof. The type of conference event can include whether the conference event is open to the public, open to a specific class of participants, or private by invitation only. In one example, a user selects an open to the public selection element on a web page hosted by a server, wherein the server is configured to obtain and process such selection element from the web page. In another example, a user sends an open to members only selection element to a server using an e-mail, wherein the server is configured to obtain and process such selection element from the e-mail. In another example, a user inputs a private by invite only selection element using an applet executing on a client device, wherein the server is configured to obtain and process such selection element sent by the applet. Further, the type of conference event can include whether the conference event allows some, none, or all of the participants to be a moderator. For example, a user selects a selection element to allow all participants to be a moderator on a web page hosted by a server, wherein the server is configured to obtain and process such selection element from the web page. In another example, a user sends to a server using an e-mail a selection element to allow only members of a club to be a moderator, wherein the server is configured to obtain and process such selection element from the e-mail. In another example, a user sends to a server using an applet a selection element to allow only a presenter to be a moderator, wherein the server is configured to obtain and process such selection element sent by the applet.

In FIG. 4, at block 403, the method 400 can provide a description of the conference event by, for instance, uploading an image file of the conference event, providing a title of the conference event, providing a description of the conference event, or any combination thereof. A user can provide the image, title, description, or any combination thereof to a server via a web page, an applet, a voice message, a text message, an e-mail, or any combination thereof. The image can be used to, for instance, allow potential participants to identify the conference event or further market the conference event. In one example, a user uploads an image file to a server using a web page hosted by the server, wherein the server is configured to obtain and process the image file from the web page. In another example, a user uploads an image file to a server using an e-mail, wherein the server is configured to obtain the e-mail and process the image file from the e-mail. In another example, a user uploads an image file to a server via an applet executing on a client device, wherein the server is configured to obtain and process the image file sent by the applet.

Further, the title can be used to identify the conference event. In one example, a user inputs the title into a title element on a web page hosted by a server, wherein the server is configured to obtain and process the title element from the web page. In another example, a user enters the title into a title element in an e-mail and sends the e-mail to a server, wherein the server is configured to obtain the e-mail and process the title element from the e-mail. In another example, a user enters the title into a title element of an applet executing on a client device, wherein a server is configured to obtain and process the title element sent by the applet. Also, a user can provide a description of the conference event. In one example, a user enters a description into a description element on a web page hosted by a server, wherein the server is configured to obtain and process the description element from such web page. In another example, a user enters a description into a description element of an e-mail and sends the e-mail to a server, wherein the server is configured to obtain the e-mail and process the description element from the e-mail. In another example, a user enters a description into a description element of an applet executing on a client device, wherein a server is configured to obtain and processes the description element sent by the applet.

At block 405, the method 400 can set a date or time for the conference event using a server via a web page, an applet, a voice message, a text message, an e-mail, or any combination thereof. In one example, a user sets the date or time of the conference event by entering the date or time into a date or time element on a web page hosted by the server, wherein the server is configured to obtain and process the date or time element from the web page. In another example, a user sends a date or time element to a server using an e-mail, wherein the server is configured to obtain the e-mail and process the date or time element from the e-mail. In another example, a user inputs the date or time into a date or time element of an applet executing on a client device, wherein a server is configured to obtain and process the date or time element sent by the applet.

At block 407, the method 400 can set a fee to be paid to each participant or an attendance limit for a conference event using a server via a web page, an applet, a voice message, a text message, an e-mail, or any combination thereof. The fee to be paid to each participant can be set for all participants or for a class of participants. In one example, a user sets the fee to be paid to each participant of a conference event by entering an amount into a participant paid element on a web page hosted by a server, wherein the server is configured to obtain and process the participant paid element from the web page. In another example, a user sets the fee to be paid to each participant of a conference event by entering an amount into a participant paid element of an e-mail and sending the e-mail to a server, wherein the server is configured to obtain the e-mail and process the participant paid element from the e-mail. In another example, a user inputs a fee to be paid to each participant of a conference event by entering the fee into a participant paid element of an applet executing on a client device, wherein a server is configured to obtain and process the participant paid element sent by the applet. In another example, a user sets a first fee to be paid to a first class of participants such as members of a community and sets a second fee to be paid to a second class of participants such as non-members of the community.

Further, the method 400 can set an attendance limit for a conference event using a server via a web page, an applet, a voice message, a text message, an e-mail, or any combination thereof. A user can set the attendance limit for a conference event by setting, for instance, a minimum required number of participants registered for the conference event to allow the conference event to occur. In one example, a user sets the attendance limit of a conference event by entering a minimum required number of participants such as twenty participants into an attendance limit element on a web page hosted by a server, wherein the server is configured to obtain and process the attendance limit element from the web page. In another example, a user sets the attendance limit for the conference event by entering a minimum required number of participants into an attendance limit element of an e-mail and sending the e-mail to a server, wherein the server is configured to obtain the e-mail and process the attendance limit element from the e-mail. In another example, a user inputs the attendance limit for the conference event by entering a minimum required number of participants into an attendance limit element of an applet executing on a client device, wherein a server is configured to obtain and process the attendance limit element sent by the applet.

At block 409, the method 400 can set a participant criteria for the conference event using a server via a web page, an applet, a voice message, a text message, an e-mail, or any combination thereof. The participant criteria can be, for instance, a language the conference event will be conducted in, a profession the conference event is targeted towards, or any other demographics or combination of demographics. In one example, a user sets the participant criteria for the conference event by selecting the English language selection element on a web page hosted by the server, wherein the server is configured to obtain and process the selection element from the web page. In another example, a user sets the participant criteria for the conference event by identifying that the conference event is targeted towards accountants using a participant criteria element in an e-mail and sending the e-mail to a server, wherein the server is configured to obtain the e-mail and process the participant criteria element from the e-mail. In another example, a user inputs the participant criteria for the conference event by entering a keyword tag to allow a prospective participant to identify the conference event using an applet executing on a client device, wherein a server is configured to obtain and process the keyword tag sent by the applet.

At block 411, the method 400 can set a task for the participants to complete. A user can recommend or require the completion of certain tasks by each participant prior to, contemporaneous with, or after the conference event using a server via a web page, an applet, a voice message, a text message, an e-mail, or any combination thereof. In one example, a user recommends that each participant read a specific document in preparation of the conference event. In another example, a user requires the participants to complete a participant evaluation after the conference event, wherein a server receives the participant evaluation from the user prior to or contemporaneous with the conference event, provides the participant evaluation to the participants contemporaneous with or after the conference event, and receives the completed participant evaluations from the participants contemporaneous with or after the conference event. In another example, a user requires the participants to answer questions during the conference event using an applet executing on a client device, wherein a server is configured to receive the questions from the user prior to or contemporaneous with the conference event, provide the questions to the applet contemporaneous with the conference event, and to obtain and process the answers to the questions from the applet contemporaneous with or after the event.

At block 413, the method 400 can market the conference event by, for instance, allowing the conference event to be posted to social networking sites such as Facebook®, Twitter® and LinkedIn®, distributed using e-mail, advertised using banner ads, other similar marketing techniques, or any combination thereof. Further, the marketing of the conference event can use keyword tags to identify prospective participants such as correlating the keyword tags with the likes or dislikes of each prospective participant. Also, the marketing of the conference event can use the conference event histories of prospective participants for targeted e-mail advertisements. For example, a user markets a conference event by using a hypertext link on a web page hosted by a server, wherein the server is configured to use the hypertext link to post the conference event on his or her Facebook® web page or LinkedIn® page. In another example, a user can enter a keyword tag associated with the conference event on a web page hosted by a server, wherein the server is configured to use the keyword tag to identify a prospective participant using his or her profile information. Once a prospective participant is identified, the server can send an e-mail to the prospective participant notifying him or her of the conference event.

At block 415, the method 400 can host the conference event by establishing communications between the participants using, for instance, voice, video, an avatar, a text message, a desktop capture, an electronic presentation, other similar communication, or any combination thereof. The voice can be captured by a microphone, converted to a digital voice signal, and sent to a server. The server can process the digital voice signal to improve its quality, change its data rate, other similar function, or any combination thereof. Further, the server can deliver the digital voice signal to other participants. In one example, the server can filter the digital voice signal to improve the quality of the audio. In another example, the server can change the data rate of the digital voice signal to conform to the data bandwidth constraints of the target listener. Similarly, the video can be captured by a camera, converted to a digital video signal, and sent to a server. The server can process the digital video signal to improve its quality, change its data rate, other similar function, or any combination thereof. For example, the server can change the frame rate of the digital video signal to conform to the data bandwidth constraints of the target viewer. In another example, the server can change the frame size of the digital video signal to conform to the data bandwidth constraints of the target viewer. The audio and video can be compressed using, for instance, the moving picture experts group (MPEG)-2 standard, MPEG-4 standard, H.263 standard, H.264 standard, other similar standards, or any combination thereof. In one example, the audio and the video are compressed using MPEG-4.

At block 417, the method 400 can receive a participant evaluation from each participant of the conference event. A user can provide the participant evaluation to a server via a web page, an applet, a voice message, a text message, an e-mail, or any combination thereof prior to, contemporaneous with, or after the conference event. In one example, a user uploads a participant evaluation form to a server using a web page hosted by the server, wherein the server is configured to process the participant evaluation form from obtain and process the participant evaluation form from the web page. In another example, a user sends a participant evaluation form to a server using an e-mail, wherein the server is configured to obtain the e-mail and process the participant evaluation form from the e-mail. In another example, a user sends a participant evaluation form to a server using an applet running on a client device, wherein the server is configured to obtain and process the participant evaluation form sent by the applet. The participant evaluation can be used to determine whether a registered participant participated in the conference event. A participant can receive the participant evaluation of a conference event from a server via a web page, an applet, a voice message, a text message, an e-mail, or any combination thereof prior to, contemporaneous with, or after the conference event. In one example, a participant completes the participant evaluation form on a web page hosted by a server, wherein the server is configured to obtain and process the completed participant evaluation form from the web page. In another example, a participant receives the participant evaluation form from a server using an e-mail, wherein the server is configured to obtain the e-mail and process the completed participant evaluation form from the e-mail. In another example, a participant receives the participant evaluation form from a server using an applet running on a client device, wherein the server is configured to obtain and process the completed participant evaluation form sent by the applet.

At block 419, the method 400 can receive the total fees to be paid to the participants from a host, an organizer, a sponsor, a presenter, a community, a charity, an organization, an individual, or any combination thereof. The total fees to be paid to the participants can be received prior to, contemporaneous with, or after the conference event. The total fees to be paid to participants can be received by a server via a check, a wire transfer, a credit card transaction such as Visa®, an online payment service such as PayPal®, another payment method, or any combination thereof. Further, the total fees to be paid to the participants can be received in a separate account, wherein a server is provided notice of the receipt of the total fees. Further, a server can monitor an account such as a PayPal® account for receipt of the total fees. For example, a server can receive a notice of the received total fees via PayPal®.

At block 421, the method 400 can pay a fee to each participant, wherein the fee paid to each participant is taken from the total fees to be paid to the participants. Further, the fee paid to a participant can be released by a server after, for instance, a certain period of time, review of the participant's participant evaluation, other method, or combination of methods. For example, the fee paid to a participant can be released to the participant thirty days after the conference event. The fee paid to the participant can be released by a server via a check, a wire transfer, a credit card transaction such as Visa®, an online payment service such as PayPal®, another payment method, or any combination thereof. For example, a server can be configured to release the fee to the participant's account using PayPal®.

Figure 5:
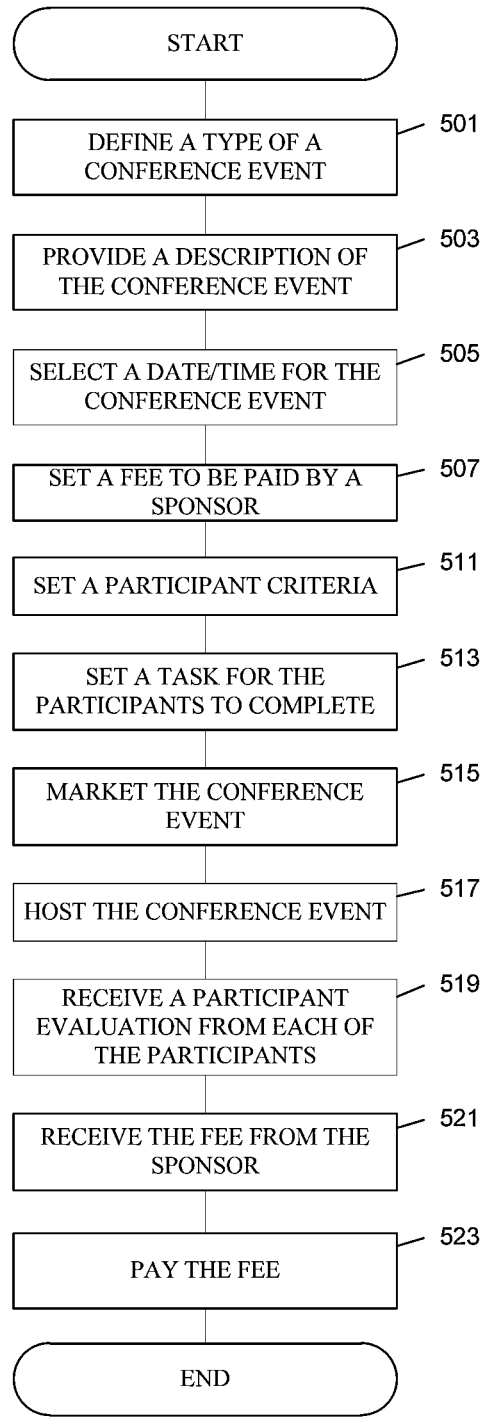
FIG. 5 is a flowchart illustrating another embodiment of a method of providing a conference event in accordance with various aspects set forth herein.

FIG. 5 is a flowchart illustrating another embodiment of a method 500 of providing a conference event in accordance with various aspects set forth herein. FIG. 5 is a flowchart illustrating one embodiment of a method 500 of providing a conference event in accordance with various aspects set forth herein. In FIG. 5, the method 500 can start at, for instance, block 501, where the method 500 can define a type of conference event. The type of conference event can be defined using a server via a web page, an applet, a voice message, a text message, an e-mail, or any combination thereof. The type of conference event can include whether the conference event is open to the public, open to a specific class of participants, or private by invitation only. In one example, a user selects an open to the public selection element on a web page hosted by a server, wherein the server is configured to obtain and process such selection element from the web page. In another example, a user sends an open to members only selection element to a server using an e-mail, wherein the server is configured to obtain and process such selection element from the e-mail. In another example, a user inputs a private by invite only selection element using an applet executing on a client device, wherein the server is configured to obtain and process such selection element sent by the applet. Further, the type of conference event can include whether the conference event allows some, none, or all of the participants to be a moderator. For example, a user selects a selection element to allow all participants to be a moderator on a web page hosted by a server, wherein the server is configured to obtain and process such selection element from the web page. In another example, a user sends to a server using an e-mail a selection element to allow only members of a club to be a moderator, wherein the server is configured to obtain and process such selection element from the e-mail. In another example, a user sends to a server using an applet a selection element to allow only a presenter to be a moderator, wherein the server is configured to obtain and process such selection element sent by the applet.

In FIG. 5, at block 503, the method 500 can provide a description of the conference event by, for instance, uploading an image file of the conference event, providing a title of the conference event, providing a description of the conference event, or any combination thereof. A user can provide the image, title, description, or any combination thereof to a server via a web page, an applet, a voice message, a text message, an e-mail, or any combination thereof. The image can be used to, for instance, allow potential participants to identify the conference event or further market the conference event. In one example, a user uploads an image file to a server using a web page hosted by the server, wherein the server is configured to obtain and process the image file from the web page. In another example, a user uploads an image file to a server using an e-mail, wherein the server is configured to obtain the e-mail and process the image file from the e-mail. In another example, a user uploads an image file to a server via an applet executing on a client device, wherein the server is configured to obtain and process the image file sent by the applet.

Further, the title can be used to identify the conference event. In one example, a user inputs the title into a title element on a web page hosted by a server, wherein the server is configured to obtain and process the title element from the web page. In another example, a user enters the title into a title element in an e-mail and sends the e-mail to a server, wherein the server is configured to obtain the e-mail and process the title element from the e-mail. In another example, a user enters the title into a title element of an applet executing on a client device, wherein a server is configured to obtain and process the title element sent by the applet. Also, a user can provide a description of the conference event. In one example, a user enters a description into a description element on a web page hosted by a server, wherein the server is configured to obtain and process the description element from such web page. In another example, a user enters a description into a description element of an e-mail and sends the e-mail to a server, wherein the server is configured to obtain the e-mail and process the description element from the e-mail. In another example, a user enters a description into a description element of an applet executing on a client device, wherein a server is configured to obtain and processes the description element sent by the applet.

At block 505, the method 500 can set a date or time for the conference event using a server via a web page, an applet, a voice message, a text message, an e-mail, or any combination thereof. In one example, a user sets the date or time of the conference event by entering the date or time into a date or time element on a web page hosted by the server, wherein the server is configured to obtain and process the date or time element from the web page. In another example, a user sends a date or time element to a server using an e-mail, wherein the server is configured to obtain the e-mail and process the date or time element from the e-mail. In another example, a user inputs the date or time into a date or time element of an applet executing on a client device, wherein a server is configured to obtain and process the date or time element sent by the applet.

At block 507, the method 500 can set a fee to be paid by a sponsor of the conference event using a server via a web page, an applet, a voice message, a text message, an e-mail, or any combination thereof. The fee to be paid by a sponsor of the conference event can be used to pay a host, an organizer, a presenter, a community, a charity, an organization, an individual, or any combination thereof. In one example, a user sets the fee to be paid by a sponsor of the conference event by entering an amount into a sponsor fee element on a web page hosted by a server, wherein the server is configured to obtain and process the sponsor fee element from the web page. In another example, a user sets the fee to be paid by a sponsor of the conference event by entering an amount into a sponsor fee element of an e-mail and sending the e-mail to a server, wherein the server is configured to obtain the e-mail and process the sponsor fee element from the e-mail. In another example, a user inputs the fee to be paid by a sponsor of the conference event by entering an amount into a sponsor fee element of an applet executing on a client device, wherein a server is configured to obtain and process the fee sent by the applet. In another example, a user sets a first fee to be paid to a first presenter and sets a second fee to be paid to a second presenter.

At block 511, the method 500 can set a participant criteria for the conference event using a server via a web page, an applet, a voice message, a text message, an e-mail, or any combination thereof. The participant criteria can be, for instance, a language the conference event will be conducted in, a profession the conference event is targeted towards, or any other demographics or combination of demographics. In one example, a user sets the participant criteria for the conference event by selecting the English language selection element on a web page hosted by the server, wherein the server is configured to obtain and process the selection element from the web page. In another example, a user sets the participant criteria for the conference event by identifying that the conference event is targeted towards accountants using a participant criteria element in an e-mail and sending the e-mail to a server, wherein the server is configured to obtain the e-mail and process the participant criteria element from the e-mail. In another example, a user inputs the participant criteria for the conference event by entering a keyword tag to allow a prospective participant to identify the conference event using an applet executing on a client device, wherein a server is configured to obtain and process the keyword tag sent by the applet.

At block 513, the method 500 can set a task for the participants to complete. A user can recommend or require the completion of certain tasks by each participant prior to, contemporaneous with, or after the conference event using a server via a web page, an applet, a voice message, a text message, an e-mail, or any combination thereof. In one example, a user recommends that each participant reads a specific document in preparation of the conference event. In another example, a user requires the participants to complete a participant evaluation after the conference event, wherein a server receives the participant evaluation from the user prior to or contemporaneous with the conference event, provides the participant evaluation to the participants contemporaneous with or after the conference event, and receives the completed participant evaluations from the participants contemporaneous with or after the conference event. In another example, a user requires the participants to answer questions during the conference event using an applet executing on a client device, wherein a server is configured to receive the questions from the user prior to or contemporaneous with the conference event, provide the questions to the applet contemporaneous with the conference event, and to obtain and process the answers to the questions from the applet contemporaneous with or after the event.

At block 515, the method 500 can market the conference event by, for instance, allowing the conference event to be posted to social media such as Facebook® and Twitter®, distributed using e-mail, advertised using banner ads, other similar marketing techniques, or any combination thereof. Further, the marketing of the conference event can use keyword tags to identify prospective participants such as correlating the keyword tags with the likes or dislikes of each prospective participant. Also, the marketing of the conference event can use the conference event histories of prospective participants for targeted e-mail advertisements. For example, a user markets a conference event by using a hypertext link on a web page hosted by a server, wherein the server is configured to use the hypertext link to post the conference event on his or her Facebook® web page or and LinkedIn® web page. In another example, a user can enter a keyword tag associated with the conference event on a web page hosted by a server, wherein the server is configured to use the keyword tag to identify a prospective participant using his or her profile information. Once a prospective participant is identified, the server can send an e-mail to the prospective participant notifying him or her of the conference event.

At block 517, the method 500 can host the conference event by establishing communications between the participants using, for instance, voice, video, avatars, text messaging, desktop capture, electronic presentation tools, other similar methods, or any combination thereof. The voice can be captured by a microphone, converted to a digital voice signal, and sent to a server. The server can process the digital voice signal to improve its quality, change its data rate, other similar function, or any combination thereof. Further, the server can deliver the digital voice signal to other participants. In one example, the server can filter the digital voice signal to improve the quality of the audio. In another example, the server can change the data rate of the digital voice signal to conform to the data bandwidth constraints of the target listener. Similarly, the video can be captured by a camera, converted to a digital video signal, and sent to a server. The server can process the digital video signal to improve its quality, change its data rate, other similar function, or any combination thereof. For example, the server can change the frame rate of the digital video signal to conform to the data bandwidth constraints of the target viewer. In another example, the server can change the frame size of the digital video signal to conform to the data bandwidth constraints of the target viewer. The audio and video can be compressed using, for instance, the moving picture experts group (MPEG)-2 standard, MPEG-4 standard, H.263 standard, H.264 standard, other similar standards, or any combination thereof. In one example, the audio and the video is compressed using MPEG-4.

At block 519, the method 500 can receive a participant evaluation from each participant of the conference event. A user can provide the participant evaluation to a server via a web page, an applet, a voice message, a text message, an e-mail, or any combination thereof prior to, contemporaneous with, or after the conference event. In one example, a user uploads a participant evaluation form to a server using a web page hosted by the server, wherein the server is configured to process the participant evaluation form from obtain and process the participant evaluation form from the web page. In another example, a user sends a participant evaluation form to a server using an e-mail, wherein the server is configured to obtain the e-mail and process the participant evaluation form from the e-mail. In another example, a user sends a participant evaluation form to a server using an applet running on a client device, wherein the server is configured to obtain and process the participant evaluation form sent by the applet. The participant evaluation can be used to determine whether a registered participant participated in the conference event. A participant can receive the participant evaluation of a conference event from a server via a web page, an applet, a voice message, a text message, an e-mail, or any combination thereof prior to, contemporaneous with, or after the conference event. In one example, a participant completes the participant evaluation form on a web page hosted by a server, wherein the server is configured to obtain and process the completed participant evaluation form from the web page. In another example, a participant receives the participant evaluation form from a server using an e-mail, wherein the server is configured to obtain the e-mail and process the completed participant evaluation form from the e-mail. In another example, a participant receives the participant evaluation form from a server using an applet running on a client device, wherein the server is configured to obtain and process the completed participant evaluation form sent by the applet.

At block 521, the method 500 can receive the fee from the sponsor of the conference event to be paid to a host, an organizer, a presenter, a community, a charity, an organization, an individual, or any combination thereof. The fee from the sponsor can be received prior to, contemporaneous with, or after the conference event. The fee from the sponsor can be received by a server via a check, a wire transfer, a credit card transaction such as Visa®, an online payment service such as PayPal®, another payment method, or any combination thereof. Further, the fee from the sponsor can be received in a separate account, wherein a server is provided notice of the receipt of the fee from the sponsor. Further, a server can monitor an account such as a PayPal® account for receipt of the fee from the sponsor. For example, a server can receive a notice of the received fee from the sponsor via PayPal®.

At block 523, the method 500 can pay the fee from the sponsor to a host, an organizer, a presenter, a community, a charity, an organization, an individual, or any combination thereof. Further, the fee from the sponsor can be released by a server after, for instance, a certain period of time. For example, the fee is paid thirty days after the conference event. The fee can be released by a server via a check, a wire transfer, a credit card transaction such as Visa®, an online payment service such as PayPal®, another payment method, or any combination thereof. For example, a server can be configured to release the fee to a presenter's account using PayPal®. In another example, the server can be configured to release the fee to a charity's account using a wire transfer.

Figure 6:
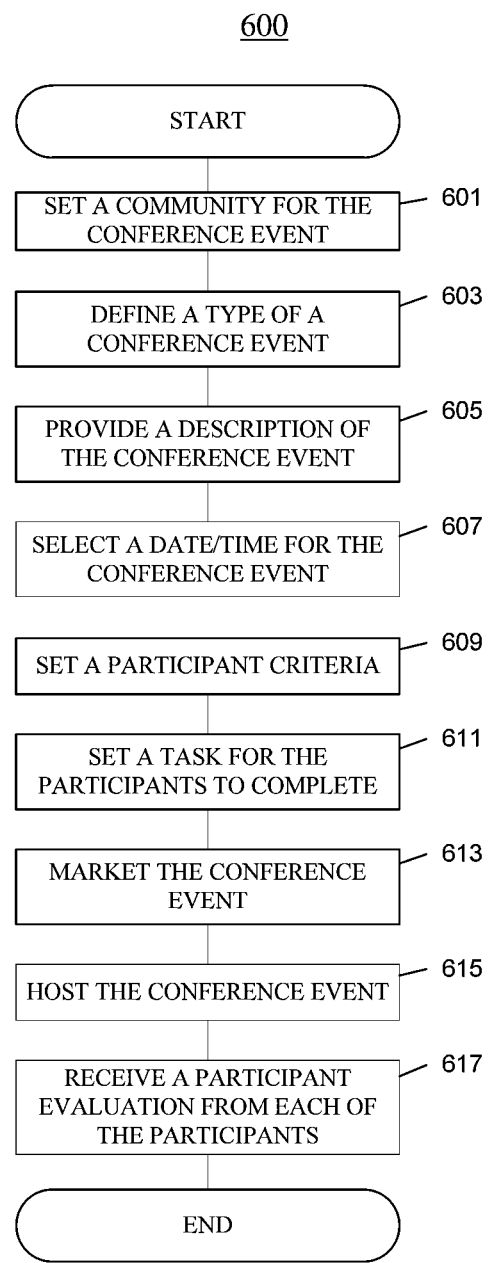
FIG. 6 is a flowchart illustrating another embodiment of a method providing a conference event in accordance with various aspects set forth herein.

FIG. 6 is a flowchart illustrating one embodiment of a method 600 of providing a conference event in accordance with various aspects set forth herein. In FIG. 6, the method 600 can start at, for instance, block 601, where it can set a community for the conference event using a server via a web page, an applet, a voice message, a text message, an e-mail, or any combination thereof. The community can be a user, a club, a charity, an organization, a company, an association, a partnership, a fraternity, a sorority, a group, an affiliation, a cooperative, a corporation, a fellowship, a society, a union, other type of association, or any combination thereof. In one example, a user sets a community for the conference event by selecting a bible study group on a web page hosted by a server, wherein the server is configured to obtain and process the selection from the web page. In another example, a user sets a community for the conference event by selecting a chess club on a web page hosted by a server, wherein the server is configured to obtain and process the selection from the web page. In another example, a user sets a community for the conference event by selecting a company using an applet executing on a client device, wherein a server is configured to obtain and process the selection sent by the applet.

At block 603, the method 600 can define a type of conference event. The type of conference event can be defined using a server via a web page, an applet, a voice message, a text message, an e-mail, or any combination thereof. The type of conference event can include whether the conference event is open to the public, community only, or private by invitation only. In one example, a user selects an open to the public selection element on a web page hosted by a server, wherein the server is configured to obtain and process such selection element from the web page. In another example, a user sends a community only selection element to a server using an e-mail, wherein the server is configured to obtain and process such selection element from the e-mail. In another example, a user inputs a private by invite only selection element using an applet executing on a client device, wherein the server is configured to obtain and process such selection element sent by the applet. Further, the type of conference event can include whether the conference event allows some, none, or all of the participants to be a moderator. For example, a user selects a selection element to allow all participants to be a moderator on a web page hosted by a server, wherein the server is configured to obtain and process such selection element from the web page. In another example, a user sends to a server using an e-mail a selection element to allow only members of a club to be a moderator, wherein the server is configured to obtain and process such selection element from the e-mail. In another example, a user sends to a server using an applet a selection element to allow only a presenter to be a moderator, wherein the server is configured to obtain and process such selection element sent by the applet.

At block 605, the method 600 can provide a description of the conference event by, for instance, uploading an image file of the conference event, providing a title of the conference event, providing a description of the conference event, or any combination thereof. A user can provide the image, title, description, or any combination thereof to a server via a web page, an applet, a voice message, a text message, an e-mail, or any combination thereof. The image can be used to, for instance, allow potential participants to identify the conference event or further market the conference event. In one example, a user uploads an image file to a server using a web page hosted by the server, wherein the server is configured to obtain and process the image file from the web page. In another example, a user uploads an image file to a server using an e-mail, wherein the server is configured to obtain the e-mail and process the image file from the e-mail. In another example, a user uploads an image file to a server via an applet executing on a client device, wherein the server is configured to obtain and process the image file sent by the applet.

Further, the title can be used to identify the conference event. In one example, a user inputs the title into a title element on a web page hosted by a server, wherein the server is configured to obtain and process the title element from the web page. In another example, a user enters the title into a title element in an e-mail and sends the e-mail to a server, wherein the server is configured to obtain the e-mail and process the title element from the e-mail. In another example, a user enters the title into a title element of an applet executing on a client device, wherein a server is configured to obtain and process the title element sent by the applet. Also, a user can provide a description of the conference event. In one example, a user enters a description into a description element on a web page hosted by a server, wherein the server is configured to obtain and process the description element from such web page. In another example, a user enters a description into a description element of an e-mail and sends the e-mail to a server, wherein the server is configured to obtain the e-mail and process the description element from the e-mail. In another example, a user enters a description into a description element of an applet executing on a client device, wherein a server is configured to obtain and processes the description element sent by the applet.

At block 607, the method 600 can set a date or time for the conference event using a server via a web page, an applet, a voice message, a text message, an e-mail, or any combination thereof. In one example, a user sets the date or time of the conference event by entering the date or time into a date or time element on a web page hosted by the server, wherein the server is configured to obtain and process the date or time element from the web page. In another example, a user sends a date or time element to a server using an e-mail, wherein the server is configured to obtain the e-mail and process the date or time element from the e-mail. In another example, a user inputs the date or time into a date or time element of an applet executing on a client device, wherein a server is configured to obtain and process the date or time element sent by the applet.

At block 609, the method 600 can set a participant criteria for the conference event using a server via a web page, an applet, a voice message, a text message, an e-mail, or any combination thereof. The participant criteria can be, for instance, a language the conference event will be conducted in, a profession the conference event is targeted towards, or any other demographics or combination of demographics. In one example, a user sets the participant criteria for the conference event by selecting the English language selection element on a web page hosted by a server, wherein the server is configured to obtain and process the selection element from the web page. In another example, a user sets the participant criteria for the conference event by identifying that the conference event is targeted towards accountants using a participant criteria element in an e-mail and sending the e-mail to a server, wherein the server is configured to obtain the e-mail and process the participant criteria element from the e-mail. In another example, a user inputs the participant criteria for the conference event by entering a keyword tag to allow a prospective participant to identify the conference event using an applet executing on a client device, wherein a server is configured to obtain and process the keyword tag sent by the applet.

At block 611, the method 600 can set a task for the participants to complete. A user can recommend or require the completion of certain tasks by each participant prior to, contemporaneous with, or after the conference event using a server via a web page, an applet, a voice message, a text message, an e-mail, or any combination thereof. In one example, a user recommends that each participant read a specific document in preparation of the conference event. In another example, a user requires the participants to complete a participant evaluation after the conference event, wherein a server receives the participant evaluation from the user prior to or contemporaneous with the conference event, provides the participant evaluation to the participants contemporaneous with or after the conference event, and receives the completed participant evaluations from the participants contemporaneous with or after the conference event. In another example, a user requires the participants to answer questions during the conference event using an applet executing on a client device, wherein a server is configured to receive the questions from the user prior to or contemporaneous with the conference event, provide the questions to the applet contemporaneous with the conference event, and to obtain and process the answers to the questions from the applet contemporaneous with or after the event.

At block 613, the method 600 can market the conference event to the community by, for instance, allowing the conference event to be posted to social networking sites such as Facebook®, Twitter® and LinkedIn®, distributed using e-mail, advertised using banner ads, other similar marketing techniques, or any combination thereof. Further, the marketing of the conference event can use keyword tags to identify prospective participants of the community. Also, the marketing of the conference event can use the conference event histories of prospective participants of the community for targeted e-mail advertisements. For example, a user markets a conference event by using a hypertext link on a web page hosted by a server, wherein the server is configured to use the hypertext link to post the conference event on his or her Facebook® web page or LinkedIn® web page. In another example, a user can enter a keyword tag associated with the conference event on a web page hosted by a server, wherein the server is configured to use the keyword tag to identify a prospective participant from the community using his or her profile information. Once a prospective participant is identified, the server can send an e-mail to the prospective participant notifying him or her of the conference event.

At block 615, the method 600 can host the conference event by establishing communications between the participants using, for instance, voice, video, an avatar, a text message, a desktop capture, an electronic presentation, other similar communication, or any combination thereof. The voice can be captured by a microphone, converted to a digital voice signal, and sent to a server. The server can process the digital voice signal to improve its quality, change its data rate, other similar function, or any combination thereof. Further, the server can deliver the digital voice signal to other participants. In one example, the server can filter the digital voice signal to improve the quality of the audio. In another example, the server can change the data rate of the digital voice signal to conform to the data bandwidth constraints of the target listener. Similarly, the video can be captured by a camera, converted to a digital video signal, and sent to a server. The server can process the digital video signal to improve its quality, change its data rate, other similar function, or any combination thereof. For example, the server can change the frame rate of the digital video signal to conform to the data bandwidth constraints of the target viewer. In another example, the server can change the frame size of the digital video signal to conform to the data bandwidth constraints of the target viewer. The audio and video can be compressed using, for instance, the moving picture experts group MPEG-2 standard, MPEG-4 standard, H.263 standard, H.264 standard, other similar standards, or any combination thereof. In one example, the audio and the video is compressed using MPEG-4.

At block 617, the method 600 can receive a participant evaluation from each participant of the conference event. A user can provide the participant evaluation to a server via a web page, an applet, a voice message, a text message, an e-mail, or any combination thereof prior to, contemporaneous with, or after the conference event. In one example, a user uploads a participant evaluation form to a server using a web page hosted by the server, wherein the server is configured to process the participant evaluation form from obtain and process the participant evaluation form from the web page. In another example, a user sends a participant evaluation form to a server using an e-mail, wherein the server is configured to obtain the e-mail and process the participant evaluation form from the e-mail. In another example, a user sends a participant evaluation form to a server using an applet running on a client device, wherein the server is configured to obtain and process the participant evaluation form sent by the applet. The participant evaluation can be used to determine whether a registered participant participated in the conference event. A participant can receive the participant evaluation of a conference event from a server via a web page, an applet, a voice message, a text message, an e-mail, or any combination thereof prior to, contemporaneous with, or after the conference event. In one example, a participant completes the participant evaluation form on a web page hosted by a server, wherein the server is configured to obtain and process the completed participant evaluation form from the web page. In another example, a participant receives the participant evaluation form from a server using an e-mail, wherein the server is configured to obtain the e-mail and process the completed participant evaluation form from the e-mail. In another example, a participant receives the participant evaluation form from a server using an applet running on a client device, wherein the server is configured to obtain and process the completed participant evaluation form sent by the applet.

Figure 7:
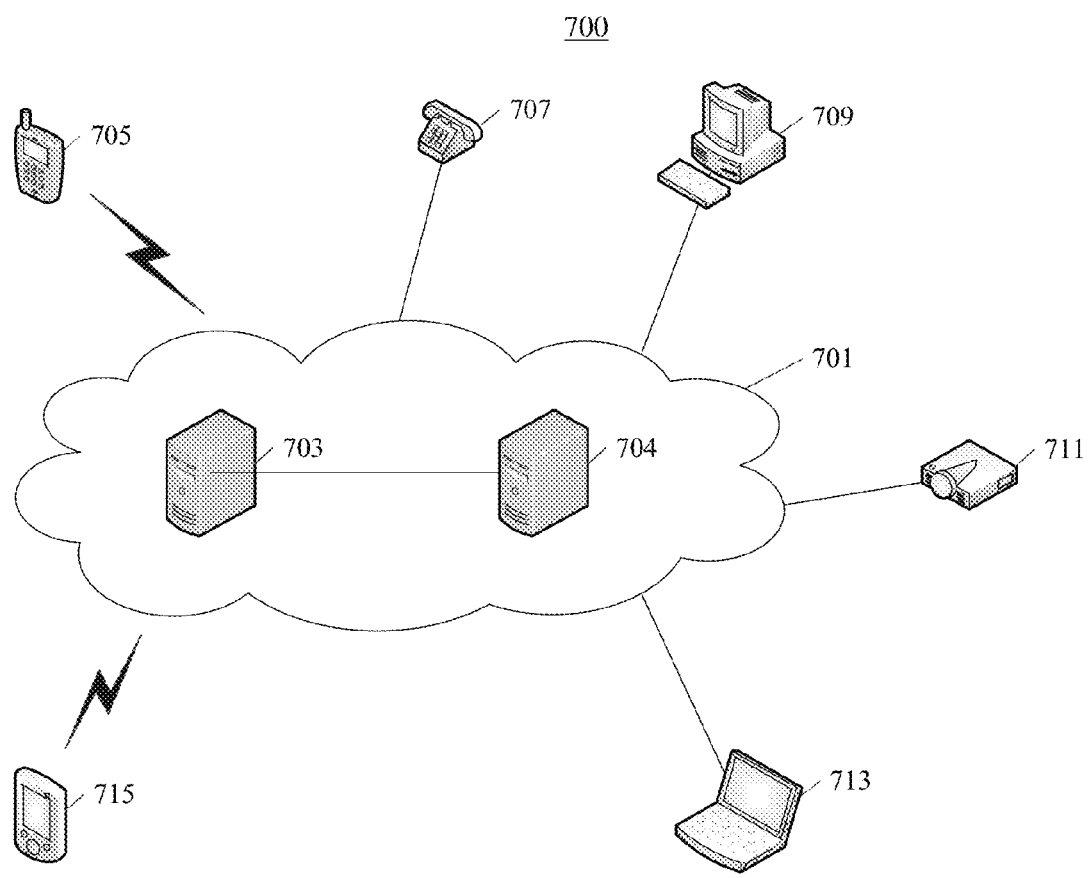
FIG. 7 illustrates another embodiment of a conferencing system in accordance with various aspects set forth herein.

FIG. 7 illustrates another embodiment of a conferencing structure 800 in accordance with various aspects set forth herein. In FIG. 7, the conferencing system 700 can include a network 701, a master server 703, a secondary server 704, and various client devices. A client device can be a wireless device 705, a POTS device 707, a computer 709, a projector 711, a portable computer 713, a smartphone 715, other device, or any combination thereof. The network 701 can include a local area network, a wireless local area network such as WiFi and WiMax, a wide area network, a wireless communication network such as GSM, CDMA, UMTS, 3G and 4G, the Internet, a public switched telephone network (PSTN), other network, or any combination thereof.

In FIG. 7, the master server 703 can be a computer program running on a computer hardware system that serves the requests of a client program, wherein the client program can either run on the same computer hardware system or connect via the network from, for instance, another computer hardware system or the client devices. Similarly, the secondary server 704 can be a computer program running on a computer hardware system that serves the requests of a client program, wherein the client program can either run on the same computer hardware system or connect via the network from, for instance, another computer hardware system or the client devices. Further, the secondary server 704 can be a client program to the master server 703. For example, the master server 703 is the master of the conference event and the secondary server 704 is a client program to the master server 703, wherein the secondary server 704 is used to support additional client programs running on client devices in a conference event. In another example, the master server 703 and the secondary server 704 are running on the same computer hardware system. In another example, the master server 703 and the secondary server 704 are running on different computer hardware systems. The master server 703 can initiate the creation of the secondary server 704 to, for instance, host additional participants in a conference event, wherein the master server 703 hosts a portion of the participants for the conference event and the secondary server 704 hosts the remainder of the participants for the conference event. Further, the master server 703 can remove the secondary server 704 when, for instance, the resource capacity of the master server 703 is sufficient for the participants in a conference event.

In the current embodiment, the wireless device 705 used in the network 701 such as a wireless communication network may also be referred to as a MS, a terminal, a cellular phone, a cellular handset, a PDA, a tablet computer, a wireless appliance, or some other equivalent terminology. The client device may include one or more RF transmitters and receivers, and one or more antennas to communicate with the network 701 via, for instance, a base station, a wireless router, an access point, other similar device, or combination of devices. The client device may be fixed or mobile and may have the ability to move through a wireless communication network. The client device can include a microphone, a speaker, a video camera, a keyboard, a mouse, a display, other input device, other display device, or any combination thereof to allow the client device to be used to communicate voice, video, an avatar, a text message, a desktop capture, an electronic presentation, other similar communication, or any combination thereof.

Figure 8:
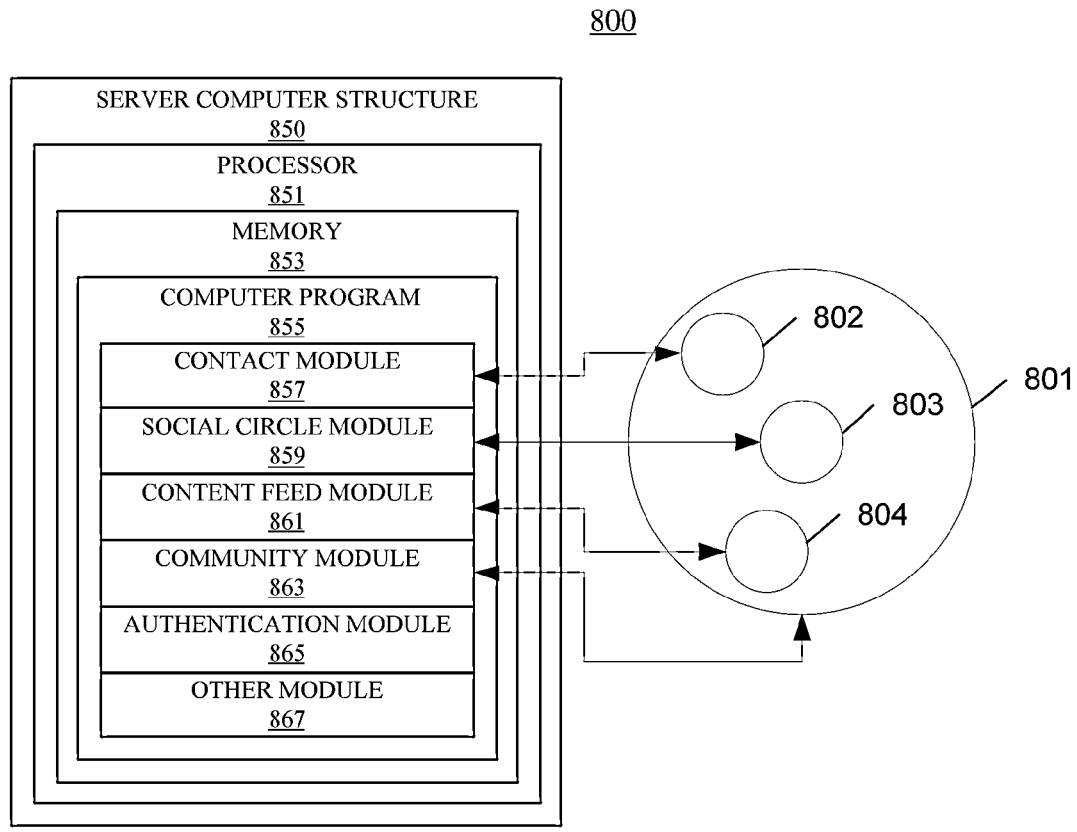
FIG. 8 illustrates a social networking structure in accordance with various aspects set forth herein.

FIG. 8 illustrates a social networking structure 800 in accordance with various aspects set forth herein. In FIG. 8, the structure 800 can be configured to include a server computer structure 850 used to perform social networking. The server computer structure 850 can be configured to include a processor 851 coupled to a memory 853, wherein the memory 853 can include a computer program 855 for performing social networking. The computer program 855 can be configured to include a contact module 857, a social circle module 859, a content feed module 861, a community module 863, an authentication module 865, and another module 867. The community module 863 can be configured to create, remove, control, operate, and manage a community 801. In one definition, a community can be a user, a group, an association, an organization, or other similar type. For example, the community 801 can be a user. In another example, the community 801 can be a plurality of users. In another definition, a community can be a social, religious, occupational, or other group of users sharing common characteristics or interests and perceived or perceiving itself as distinct in some respect from the larger society of users within which it exists. For example, the community 801 can be a plurality of users interested in accounting. In another example, the community 801 can be a plurality of groups interested in a religion.

In FIG. 8, the community 801 can be configured to include a contact 802, a social circle 803, and a content feed 804. The contact module 857 can be configured to create, remove, control, operate, and manage the contact 802 of the community 801. The contact 802 can be a friend, a family member, a colleague, an associate, an acquaintance, a community, a business, an association, an organization, or other type of contact. For example, a user can add a friend as a contact 802 to the community 801 via the contact module 857. The social circle module 859 can be configured to create, remove, control, operate, and manage the social circle 803 of the community 801. The social circle 803 can be all or a portion of the contacts 802 of the community 801 grouped by a user. The social circle 803 can be a portion of the contacts 802 of the community 801 grouped as, for instance, friends, family, colleagues, associates, associations, groups, other contacts, or any combination thereof. For example, the social circle 803 can include one group of contacts of the community 801 that have a common interest such as a hobby, a profession and an area of study. In another example, the social circle 803 can include a group of friends, a group of family, and a group of associates. It is important to recognize that a contact can be assigned to multiple groups. In one implementation, the social circle module 857 adds the contact 802 to the social group 803 by placing a label on such contact. In such implementation, the contact 802 can have multiple labels corresponding to multiple social groups 803.

In this embodiment, the content feed module 861 can be configured to create, remove, control, operate, and manage the content feed 804. The content feed 804 can include a personal web space, a blog, a message, an activity, a video, a picture, a desktop, a personal detail, a conference event, a history of conference events attended, a favorite conference event, other information, or any combination thereof. The personal detail can include the user's age, date of birth, hometown, academic background, professional background, hobbies, social circles, other personal detail, or any combination thereof. The authentication module 865 can make all or any portion of the contact 802, the social circle 803, the content feed 804, or any combination thereof public or private information to the community 801 or outside of the community 801. Further, the authentication module 865 can make any public or private information of the community 801 available to the contact 802, the social circle 803, the content feed 804, or any combination thereof. For example, the authentication module 865 can make the contact 802 of the community 801 available to the social circle 803. In another example, the authentication module 865 can make the content feed 804 of the community 801 available to the social circle 803. In another example, the authentication module 865 can make an image file stored in the content feed 804 of the community 801 available to the contact 802. In another example, the authentication module 865 can make the content feed 804 over to the public. The other module 867 can be configured to provide any other functions and/or features, including interfacing with social networking sites such as such as Facebook®, Twitter® and LinkedIn®, and interfacing with user devices such as computers, laptops, smartphones, wireless devices, tablet computers and appliances, interfacing with the server computer program 205, interfacing with the client computer program 1205, or any combination thereof.

Figure 9:
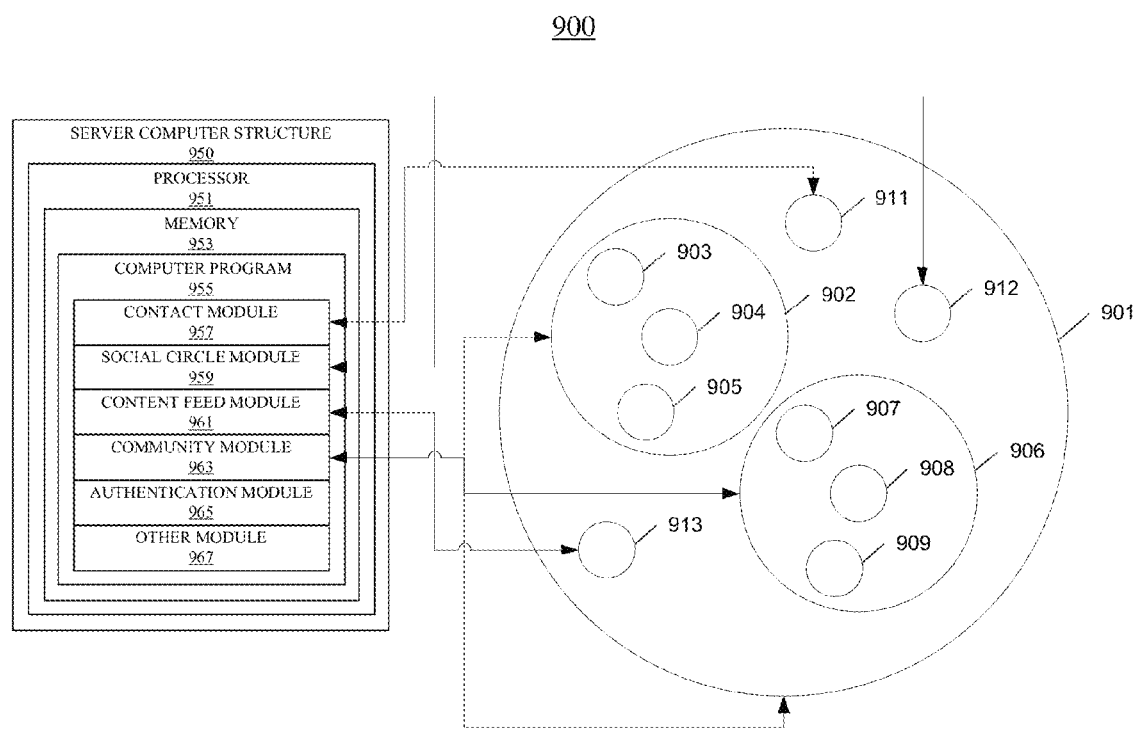
FIG. 9 illustrates another social networking structure in accordance with various aspects set forth herein.

FIG. 9 illustrates a social networking structure 900 in accordance with various aspects set forth herein. In FIG. 9, the structure 900 can be configured to include a server computer structure 950 used to perform social networking. The server computer structure 950 can be configured to include a processor 951 coupled to a memory 953, wherein the memory 953 can include a computer program 955 for performing social networking. The computer program 955 can be configured to include a contact module 957, a social circle module 959, a content feed module 961, a community module 963, an authentication module 965, and another module 967. The community module 963 can be configured to create, remove, control, operate, and manage each of the communities 901, 902 and 906. Each of the communities 901, 902 and 906 can be a user, a group, a community, an association, an organization, or other similar type. For example, the community 901 can be a community, and the communities 902 and 906 can be users. In another example, the community 901 can be an organization, the community 902 can be a user, and the community 906 can be a group. The community 902 can be configured to include a contact 903, a social circle 904, and a content feed 905. The community 906 can be configured to include a contact 907, a social circle 908, and a content feed 909. The community 901 can be configured to include a contact 911, a social circle 912, and a content feed 913.

In FIG. 9, the contact module 957 can be configured to create, remove, control, operate, and manage the contact 903 of the community 901, the contact 907 of the community 906, and the contact 911 of the community 901. Each of the contacts 903, 907 and 911 can be a friend, a family member, a colleague, an associate, an acquaintance, a community, a business, an association, an organization, or other type of contact. For example, a user can add a friend as a contact 903 to the community 901 via the contact module 957. Further, each community can include the contacts of any community that it contains. For example, the community 901 can include its contact 911, the contact 903 of the community 902, the contact 907 of the community 906, or any combination thereof. The social circle module 959 can be configured to create, remove, control, operate, and manage the social circle 904 of the community 902, the social circle 908 of the community 906, and the social circle 912 of the community 901. The social circle 904, 908 and 912 can be all or a portion of the contacts 903, 907 and 911 of the community 902, 906 and 901 grouped by a user as, for instance, friends, family, colleagues, associates, associations, groups, other contacts, or any combination thereof, respectively. For example, the social circle 904 can include one group of the contacts 903 of the community 902 that have a common interest such as a hobby, a profession and an area of study. In another example, the social circle 908 can include those contacts 907 forming a social circle of friends. Further, each community can include the social circles of any community that it contains. For example, the community 901 can include its social circle 912, the social circle 904 of the community 902, the social circle 908 of the community 906, or any combination thereof.

In this embodiment, the content feed module 961 can be configured to create, remove, control, operate, and manage the content feed 905 of the community 902, the content feed 909 of the community 906, and the content feed 912 of the community 901. Each of the content feeds 905, 909 and 912 can include a personal detail, a conference event, a history of conference events attended, a favorite conference event, other information, or any combination thereof. Further, each community can include the content feed of any community that it contains. For example, the community 901 can include the content feed 905 of the community 902, or the community feed 909 of the community 906, or any combination thereof.

In the current embodiment, the authentication module 965 can make all or any portion of each of the contacts 903, 907 and 911, each of the social circles 904, 908 and 912, each of the content feeds 905, 909 and 913, or any combination thereof public or private information to any of the communities 902, 906 and 901 or outside any of the communities 902, 906 and 901. Further, the authentication module 965 can make any private information of each of the communities 902, 906 and 901 available to each of the contacts 903, 907 and 911, each of the social circles 904, 908 and 912, each of the content feeds 905, 909 and 913, or any combination thereof, respectively. For example, the authentication module 965 can make the contact 903 of the community 902 available to the social circle 904. Further, the authentication module 965 can make the content feed 905 of the community 902 available to the social circle 904. Also, the authentication module 965 can make an image file stored in the content feed 905 of the community 901 available to the contact 903. The other module 967 can be configured to provide any other functions and/or features, including interfacing with social networking sites such as such as Facebook®, Twitter® and LinkedIn®, and interfacing with user devices such as computers, laptops, smartphones, wireless devices, tablet computers and appliances, interfacing with the server computer program 205, interfacing with the client computer program 1205, or any combination thereof.

In FIG. 9, the community module 963 can be configured to allow the community 902 to merge with the community 901. For example, the community 901 can send a request such as an e-mail, text message, other message, or any combination thereof to the community 902 to merge. The community 902 can accept or decline such request. An acceptance by a community may require approval by one or more users. In one example, a community may require a majority of its members to approve any merger with another community. In another example, a plurality of members of a community may be required to approve any merger with another community. In another example, a pre-approved group of members of a committee to approve any merger with another community. In addition, the community module 963 can be configured to allow the community 906 to join the community 901 by, for instance, receiving and accepting an invitation from the community 901, requesting to join the community 901 and being accepted, other like method, or any combination thereof. For example, the community 901 can send an invitation using, for instance, an e-mail, text message, other message, or any combination thereof to the community 906 to join the community 901. The community 906 can accept or not accept the invitation. Once the community 906 accepts the invitation to join the community 901, then the community 906 is a member of the community 901. The community 906 can determine whether to make its contact 906, its social circle 907, its content feed 908, or any combination thereof accessible by other members of the community 901.

Figure 10:
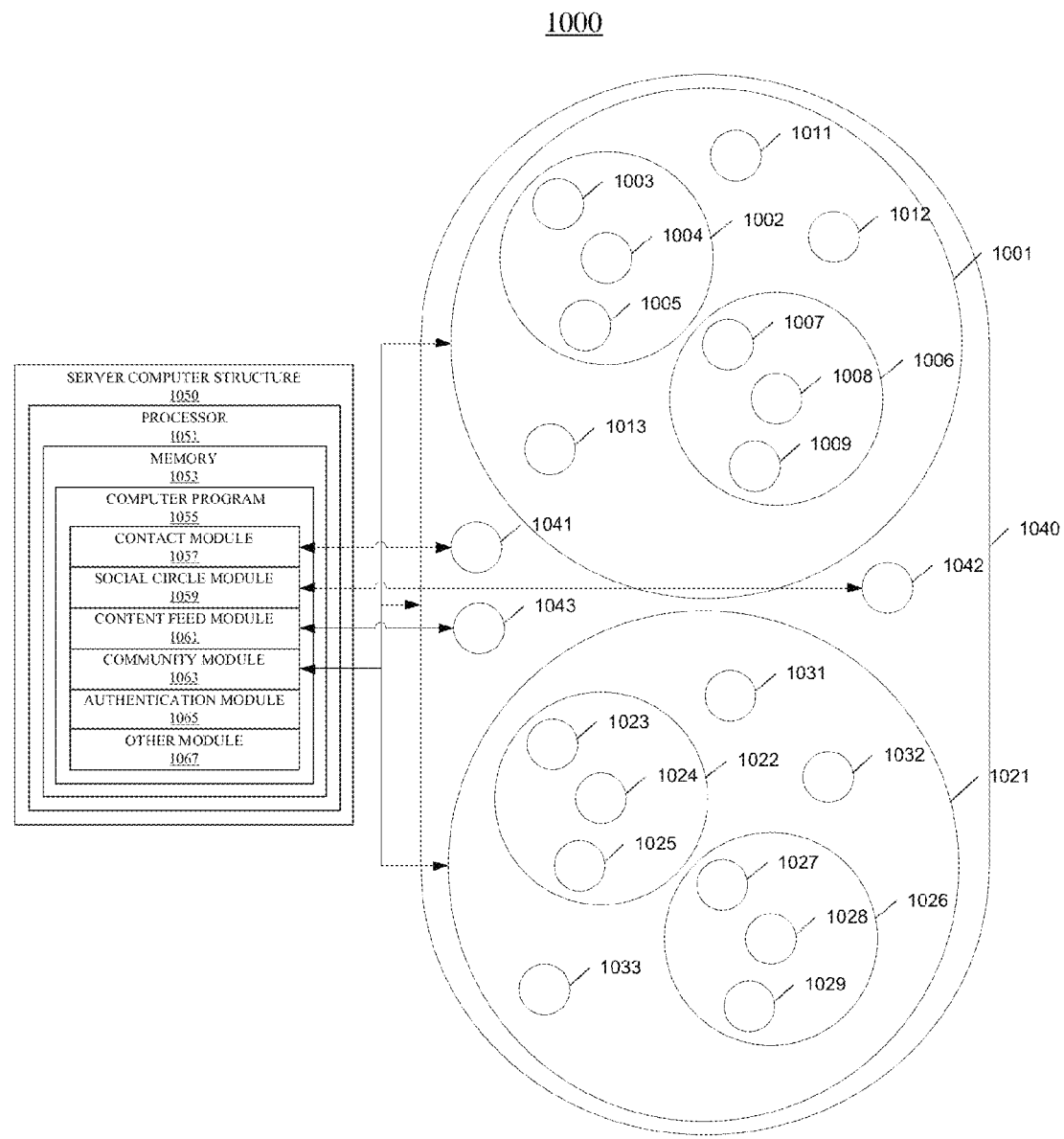
FIG. 10 illustrates another social networking structure in accordance with various aspects set forth herein.

FIG. 10 illustrates a social networking structure 1000 in accordance with various aspects set forth herein. In FIG. 10, the structure 1000 can be configured to include a server computer structure 1050 used to perform social networking. The server computer structure 850 can be configured to include a processor 1051 coupled to a memory 1053, wherein the memory 1053 can include a computer program 1055 for performing social networking. The computer program 1055 can be configured to include a contact module 1057, a social circle module 1059, a content feed module 1061, a community module 1063, an authentication module 1065, and another module 1067. The community module 1063 can be configured to create, remove, control, operate, and manage a communities 1001, 1002, 1006, 1021, 1022, 1026 and 1040. Each of the communities 1001, 1002, 1006, 1021, 1022, 1026 and 1040 can be a user, a group, a community, an association, an organization, or other similar type. For example, the community 1001 can be a community, and the communities 1002 and 1006 can be users. In another example, the community 1021 can be an organization, the community 1022 can be a user, and the community 1026 can be a group. Each of the communities 1001, 1002, 1006, 1021, 1022, 1026 and 1040 can be configured to include a contact 1003, 1007, 1011, 1023, 1027, 1031 and 1041, a social circle 1004, 1008, 1012, 1028, 1032 and 1042, and a content feed 1005, 1009, 1013, 1029, 1033 and 1043, respectively.

In FIG. 10, the contact module 1057 can be configured to create, remove, control, operate, and manage each of the contacts 1003, 1007, 1011, 1023, 1027, 1031 and 1041. Each of the contacts 1003, 1007, 1011, 1023, 1027, 1031 and 1041 can be a friend, a family member, a colleague, an associate, an acquaintance, a community, a business, an association, an organization, or other type of contact. For example, a user can add a friend as a contact 1003 to the community 1001 via the contact module 1057. Further, each community can include the contacts of any community that it contains. For example, the community 1001 can include its contacts 1011, the contact 1003 of the community 1002, the contact 1007 of the community 1006, or any combination thereof. As another example, the community 1040 can include its contact 1041, the contact 1011 of the community 1001, the contact 1003 of the community 1002, the contact 1007 of the community 1006, the contact 1031 of the community 1021, the contact 1023 of the community 1022, the contact 1027 of the community 1026, or any combination thereof.

In this embodiment, the social circle module 1059 can be configured to create, remove, control, operate, and manage each of the social circles 1004, 1008, 1012, 1028, 1032 and 1042. Each of the social circles 1004, 1008, 1012, 1028, 1032 and 1042 can be all or a portion of each of the contacts 1003, 1007, 1011, 1023, 1027, 1031 and 1041 grouped by a user as, for instance, friends, family, colleagues, associates, associations, groups, other contacts, or any combination thereof, respectively. Further, each community can include the social circle of any community that it contains. For example, the community 1001 can include its social circle 1012, the social circle 1004 of the community 1002, the social circle 1007 of the community 1006, or any combination thereof. As another example, the community 1040 can include its social circle 1042, the social circle 1012 of the community 1001, the social circle 1004 of the community 1002, the social circle 1008 of the community 1006, the social circle 1032 of the community 1021, the social circle 1024 of the community 1022, the social circle 1028 of the community 1026, or any combination thereof.

In the current embodiment, the content feed module 1061 can be configured to create, remove, control, operate, and manage each of the content feeds 1005, 1009, 1013, 1025, 1029, 1033 and 1043. Each of the content feeds 1005, 1009, 1013, 1025, 1029, 1033 and 1043 can include a personal detail, a conference event, a history of conference events attended, a favorite conference event, other information, or any combination thereof. Further, each community can include the content feed of any community that it contains. For example, the community 1001 can include its content feed 1013, the content feed 1005 of the community 1002, the content feed 1009 of the community 1006, or any combination thereof. As another example, the community 1040 can include its content feed 1043, the content feed 1013 of the community 1001, the content feed 1005 of the community 1002, the content feed 1009 of the community 1006, the content feed 1033 of the community 1021, the content feed 1025 of the community 1022, the content feed 1029 of the community 1026, or any combination thereof.

In FIG. 10, the authentication module 1065 can make any portion of each of the contacts 1003, 1007, 1011, 1023, 1027, 1031 and 1041, each of the social circles 1004, 1008, 1012, 1024, 1028, 1032 and 1042, each of the content feeds 1005, 1009 and 1013, 1025, 1029, 1033 and 1043, or any combination thereof public or private information to any of the communities 1002, 1006, 1001, 1022, 1026, 1021 and 1040 or outside any of such communities 1002, 1006, 1001, 1022, 1026, 1021 and 1040, respectively. Further, the authentication module 1065 can make any private information of each of the communities 1002, 1006, 1001, 1022, 1026, 1021 and 1040 available to each of the contacts 1003, 1007, 1011, 1023, 1027, 1031 and 1041, each of the social circles 1004, 1008, 1012, 1024, 1028, 1032 and 1042, each of the content feeds 1005, 1009 and 1013, 1025, 1029, 1033 and 1043, or any combination thereof, respectively. For example, the authentication module 1065 can make the contact 1003 of the community 1002 available to the social circle 1004. Further, the authentication module 1065 can make the content feed 1005 of the community 1002 available to the social circle 1004. Also, the authentication module 1065 can make an image file stored in the content feed 1005 of the community 1001 available to the contact 1003. The other module 1067 can be configured to provide any other functions and/or features, including interfacing with social networking sites such as such as Facebook®, Twitter® and LinkedIn®, and interfacing with user devices such as computers, laptops, smartphones, wireless devices, tablet computers and appliances, interfacing with the server computer program 205, interfacing with the client computer program 1205, or any combination thereof.

In FIG. 10, the community module 1063 can be configured to allow the community 1002 to merge with the community 1001. For example, the community 1001 can send a request using, for instance, an e-mail, text message, other message, or any combination thereof to the community 1002 to merge. The community 1002 can accept or decline such request. An acceptance by a community may require approval by one or more users. In one example, a community may require a majority of its members to approve any merger with another community. In another example, a plurality of members of a community may be required to approve any merger with another community. In another example, a pre-approved group of members of a committee to approve any merger with another community. In addition, the community module 1063 can be configured to allow the community 1006 to join the community 1001 by, for instance, receiving and accepting an invitation from the community 1001, requesting to join the community 1001 and being accepted, other like method, or any combination thereof. For example, the community 1001 can send an invitation using, for instance, an e-mail, text message, other message, or any combination thereof to the community 1006 to join the community 1001. The community 1006 can accept or not accept the invitation. Once the community 1006 accepts the invitation to join the community 1001, then the community 1006 is a member of the community 1001. The community 1006 can determine whether to make its contact 1006, its social circle 1007, its content feed 1008, or any combination thereof accessible by other members of the community 1001. Similarly, the community 1001 can determine whether to make its contact 1006, its social circle 1007, its content feed 1008, or any combination thereof accessible by members of the community 1006.

Figure 11:
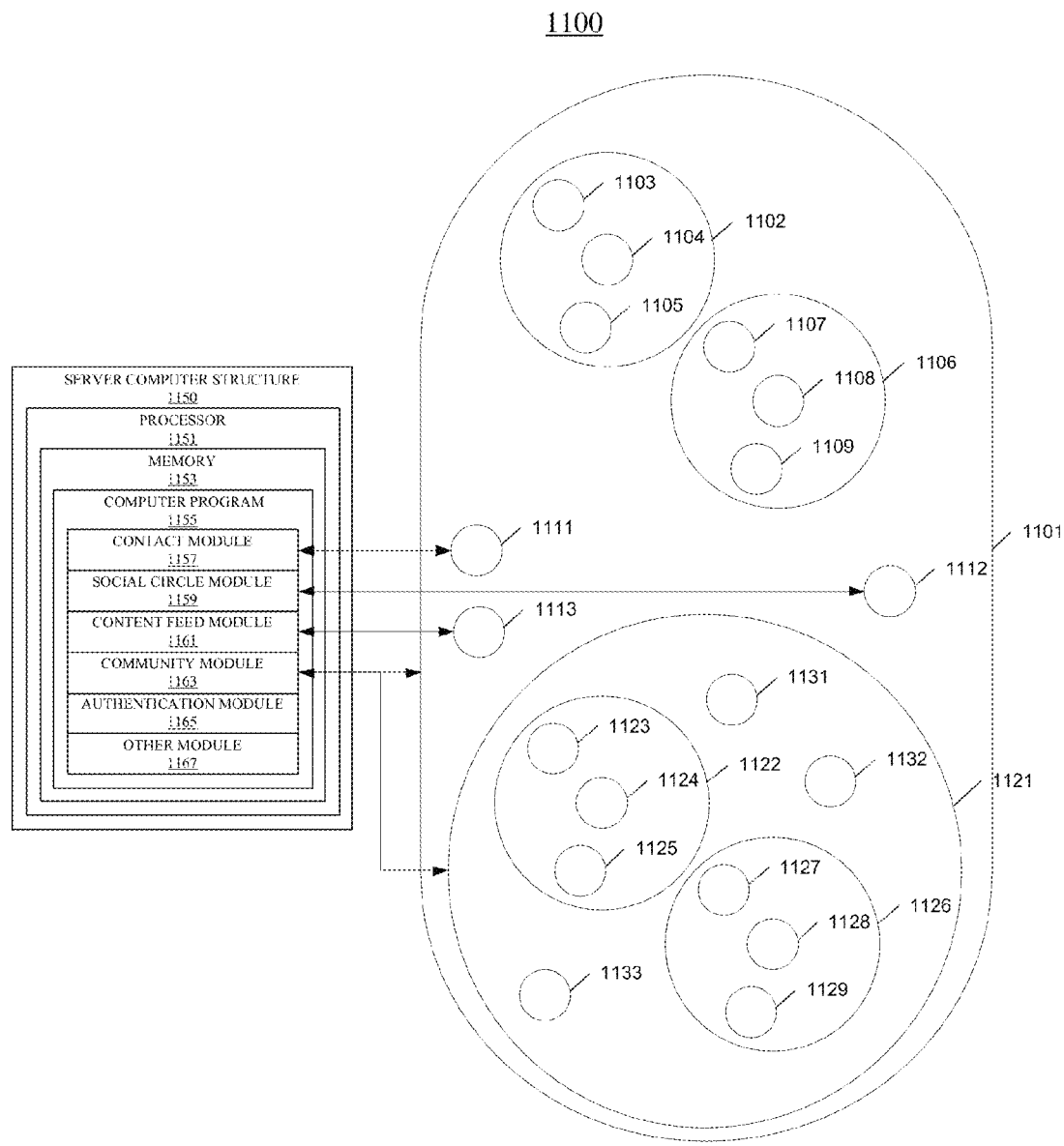
FIG. 11 illustrates another social networking structure in accordance with various aspects set forth herein.

FIG. 11 illustrates a social networking structure 1100 in accordance with various aspects set forth herein. In FIG. 11, the structure 1100 can be configured to include a server computer structure 1150 used to perform social networking. The server computer structure 850 can be configured to include a processor 1151 coupled to a memory 1153, wherein the memory 1153 can include a computer program 1155 for performing social networking. The computer program 1155 can be configured to include a contact module 1157, a social circle module 1159, a content feed module 1161, a community module 1163, an authentication module 1165, and another module 1167. The community module 1163 can be configured to create, remove, control, operate, and manage a communities 1101, 1102, 1106, 1121, 1122 and 1126. Each of the communities 1101, 1102, 1106, 1121, 1122 and 1126 can be a user, a group, a community, an association, an organization, or other similar type. For example, each of the communities 1101 and 1121 can be a community, and each of the communities 1102, 1106, 1122 and 1126 can be a user. In another example, the community 1101 can be an organization, each of the communities 1102 and 1122 can be a user, and each of the communities 1106 and 1126 can be a group. Each of the communities 1101, 1102, 1106, 1121, 1122 and 1126 can be configured to include a contact 1103, 1107, 1111, 1123, 1127 and 1131, a social circle 1104, 1108, 1112, 1128 and 1132, and a content feed 1105, 1109, 1113, 1129 and 1133, respectively.

In FIG. 11, the contact module 1157 can be configured to create, remove, control, operate, and/or manage each of the contacts 1103, 1107, 1111, 1123, 1127 and 1131. Each of the contacts 1103, 1107, 1111, 1123, 1127 and 1131 can be a friend, a family member, a colleague, an associate, an acquaintance, a community, a business, an association, an organization, or other type of contact. For example, a user can add a friend as the contact 1103 to the community 1102 using the contact module 1157. Further, each community can include the contacts of any community that it contains. For example, the community 1121 can include its contact 1131, the contact 1123 of the community 1122, the contact 1127 of the community 1126, or any combination thereof. As another example, the community 1101 can include its contact 1111, the contact 1103 of the community 1102, the contact 1107 of the community 1106, the contact 1131 of the community 1121, the contact 1123 of the community 1122, the contact 1127 of the community 1126, or any combination thereof.

In this embodiment, the social circle module 1159 can be configured to create, remove, control, operate, and/or manage each of the social circles 1104, 1108, 1112, 1124, 1128 and 1132. Each of the social circles 1104, 1108, 1112, 1124, 1128 and 1132 can be all or a portion of each of the contacts 1103, 1107, 1111, 1123, 1127 and 1131 grouped by a user as, for instance, friends, family, colleagues, associates, associations, groups, other contacts, or any combination thereof, respectively. Further, each community can include the social circle of any community that it contains. For example, the community 1121 can include its social circle 1132, the social circle 1124 of the community 1122, the social circle 1127 of the community 1126, or any combination thereof. As another example, the community 1101 can include its social circle 1112, the social circle 1104 of the community 1102, the social circle 1108 of the community 1106, the social circle 1132 of the community 1121, the social circle 1124 of the community 1122, the social circle 1128 of the community 1126, or any combination thereof.

In the current embodiment, the content feed module 1161 can be configured to create, remove, control, operate, and/or manage each of the content feeds 1105, 1109, 1113, 1125, 1129 and 1133. Each of the content feeds 1105, 1109, 1113, 1125, 1129 and 1133 can include a personal detail, a conference event, a history of conference events attended, a favorite conference event, other information, or any combination thereof. Further, each community can include the content feed of any community that it contains. For example, the community 1121 can include its content feed 1133, the content feed 1125 of the community 1122, the content feed 1129 of the community 1126, or any combination thereof. As another example, the community 1101 can include its content feed 1113, the content feed 1105 of the community 1102, the content feed 1109 of the community 1106, the content feed 1133 of the community 1121, the content feed 1125 of the community 1122, the content feed 1129 of the community 1126, or any combination thereof.

In FIG. 11, the authentication module 1165 can make any portion of each of the contacts 1103, 1107, 1111, 1123, 1127 and 1131, each of the social circles 1104, 1108, 1112, 1124, 1128 and 1132, each of the content feeds 1105, 1109, 1113, 1125, 1129 and 1133, or any combination thereof public or private information to any of the communities 1102, 1106, 1101, 1122, 1126 and 1121 or outside any of such communities 1102, 1106, 1101, 1122, 1126 and 1121, respectively. Further, the authentication module 1165 can make any private information of each of the communities 1102, 1106, 1101, 1122, 1126 and 1121 available to each of the contacts 1103, 1107, 1111, 1123, 1127 and 1131, each of the social circles 1104, 1108, 1112, 1124, 1128 and 1132, each of the content feeds 1105, 1109, 1113, 1125, 1129 and 1133, or any combination thereof, respectively. For example, the authentication module 1165 can make the contact 1103 of the community 1102 available to the social circle 1104. Further, the authentication module 1165 can make the content feed 1105 of the community 1102 available to the social circle 1104. Also, the authentication module 1165 can make an image file stored in the content feed 1105 of the community 1101 available to the contact 1103. The other module 1167 can be configured to provide any other functions and/or features, including interfacing with a social networking site such as Facebook®, Twitter® and LinkedIn®, interfacing with user devices such as computers, laptops, smartphones, wireless devices, tablet computers and appliances, interfacing with the server computer program 205, interfacing with the client computer program 1205, or any combination thereof.

In FIG. 11, the community module 1163 can be configured to allow the community 1121 to merge with the community 1101, as shown. For example, the community 1101 can send a request using, for instance, an e-mail, text message, other message, or any combination thereof to the community 1121 to merge. The community 1121 can accept or decline such request. An acceptance by a community may require approval by one or more users. In one example, a community may require a majority of its members to approve any merger with another community. In another example, a plurality of members of a community may be required to approve any merger with another community. In another example, a pre-approved or pre-selected group of members of a community may be required to approve any merger with another community.

Figure 12:
FIG. 12 illustrates one embodiment of a client computer structure for performing a conference event hosted by a server or another client device in accordance with various aspects set forth herein.

FIG. 12 illustrates one embodiment of a client computer structure 1200 for supporting a conference event hosted by a server or another client device in accordance with various aspects set forth herein. In FIG. 12, the structure 1200 can be configured to include a processor 1201 coupled to a memory 1203, wherein the memory 1203 can include a client computer program 1205 for supporting a conference event. The structure 1200 can be a client device such as a wireless device, a POTS device, a computer, a projector, a portable computer, a smartphone, other device, or any combination thereof. The client computer program 1205 can be configured to support a conference event by communicating with a server via a web page, an applet, a voice message, a text message, an e-mail, or any combination thereof. Further, the client computer program 1205 can be configured to participate in the conference event using, for instance, voice, video, an avatar, a text message, a desktop capture, an electronic presentation, other similar communication, or any combination thereof. The client computer program 1205 can be configured to include an event creation module 1207, a marketing module 1209, a communication module 1211, an evaluation module 1213, a payment module 1215, a sponsor module 1217, a community module 1221, a participant fee module 1223, a participant paid module 1225, and another module 1227.

In the current embodiment, the event creation module 1207 can be configured to allow a user of the structure 1200 to create a conference event via a server by selecting the type of conference event, providing a description of the conference event, selecting a date or time for the conference event, setting a participant criteria, setting a task for the participants to complete, performing another similar function, or any combination thereof. The marketing module 1209 can be configured to allow a user to market the conference event by, for instance, allowing the conference event to be posted to the user's social networking sites such as Facebook®, Twitter® and LinkedIn®, distributed to the user's contacts using e-mail, advertised using banner ads, other similar marketing techniques, or any combination thereof. The communication module 1211 can be configured to allow a user of the structure

1200 to participate in the conference event by establishing communications between the structure 1200 and a server and/or other client devices. Further, the communication module 1211 can be configured to allow a user of the structure 1200 to participate in the conference event using, for instance, voice, video, an avatar, a text message, a desktop capture, an electronic presentation, other similar communication, or any combination thereof. The evaluation module 1213 can be configured to receive, complete, and return a participant evaluation to a server and/or other client. A participant evaluation allows the host of the conference event to receive feedback from the participants of such conference event.

In this embodiment, the payment module 1215 can be configured to make, receive, process, or verify a payment associated with a conference event via a check, a wire transfer, a credit card transaction such as Visa®, an online payment service such as PayPal®, another payment method, or any combination thereof. The sponsor module 1217 can be configured to create, delete, set, process, or manage a fee to be paid by a sponsor of the conference event, receive a fee from a sponsor, other function, or any combination thereof. The community module 1221 can be configured to create, delete, set, process, or manage a community, including for a conference event. The participant fee module 1223 can be configured to create, delete, set, process, or manage a fee to be paid by each participant of the conference event. The participant paid module 1225 can be configured to create, delete, set, process, or manage a fee to be paid to each participant of the conference event by the host or sponsor of such event. The other module 1227 can be configured to be used to support any of the other modules in the client computer program 1205.

Figure 13:
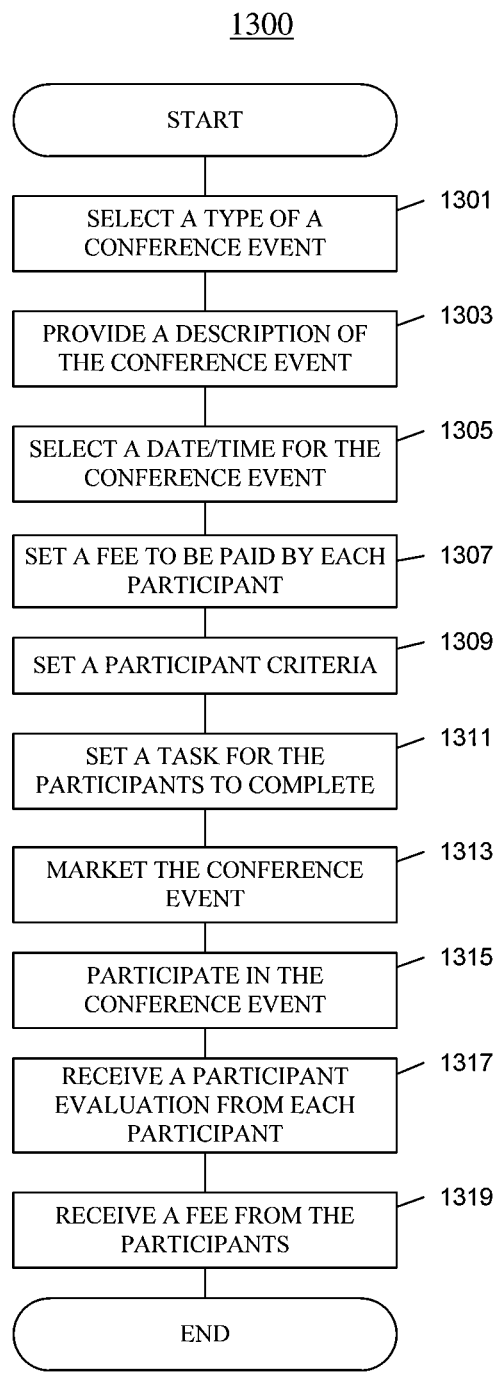
FIG. 13 is a flowchart illustrating one embodiment of a method of using a client device to perform a conference event hosted by a server or another client device in accordance with various aspects set forth herein.

FIG. 13 is a flowchart illustrating one embodiment of a method 1300 of using a client device to perform a conference event hosted by a server or another client device in accordance with various aspects set forth herein. In FIG. 13, the method 1300 can start at, for instance, block 1301, where the method 1300 can use a client device to select a type of a conference event hosted by a server or another client device. The type of conference event can be selected by a client device via a server or another client device using a web page, an applet, a voice message, a text message, an e-mail, or any combination thereof. In one example, a client device selects an open to the public selection element on a web page hosted by a server or another client device, wherein the server or the other client device is configured to obtain and process such selection element from the web page. In another example, a client device sends an open to members only selection element to a server or another client device using an e-mail, wherein the server or the other client device is configured to obtain and process such selection element from the e-mail. In another example, a client device inputs a private by invite only selection element using an applet, wherein a server or another client device is configured to obtain and process such selection element. Further, the type of conference event can include whether the conference event allows some, none, or all of the participants to be a moderator. For example, a client device selects on a web page hosted by a server or another client device a selection element to allow all participants to be a moderator, wherein the server or the other client device is configured to obtain and process such selection element from the web page. In another example, a client device sends to a server or another client device using an e-mail a selection element to allow only members of a club to be a moderator, wherein the server or the other client device is configured to obtain and process such selection element from the e-mail. In another example, a client device sends to a server or another client device using an applet a selection element to allow only a presenter to be a moderator, wherein the server or the other client device is configured to obtain and process such selection element.

In FIG. 13, at block 1303, the method 1300 can use a client device to provide a description of the conference event hosted by a server or another client device by, for instance, uploading an image file of the conference event, providing a title of the conference event, providing a description of the conference event, or any combination thereof. A client device can provide the image, title, description, or any combination thereof to a server or another client device via a web page, an applet, a voice message, a text message, an e-mail, or any combination thereof. The image can be used to, for instance, allow potential participants to identify the conference event or further market the conference event. In one example, a client device uploads the image file to a server or another client device using a web page hosted by the server or the client device, wherein the server or the client device is configured to obtain and process the image file from the web page. In another example, a client device uploads the image file to a server or another client device using an e-mail, wherein the server or the other client device is configured to obtain the e-mail and process the image file from the e-mail. In another example, a client device uploads the image file to a server or another client device via an applet executing on the client device, wherein the server or the other client device is configured to obtain and process the image file.

Further, the title can be used to identify the conference event. In one example, a client device inputs the title into a title element on a web page hosted by a server or another client device, wherein the server or the other client device is configured to obtain and process the title element from the web page. In another example, a client device enters the title into a title element in an e-mail and sends the e-mail to a server or another client device, wherein the server or the other client device is configured to obtain the e-mail and process the title element from the e-mail. In another example, a client device enters the title into a title element of an applet executing on a client device, wherein a server or another client device is configured to obtain and process the title. Also, a client device can provide a description of the conference event. In one example, a client device enters a description into a description element on a web page hosted by a server or another client device, wherein the server or the other client device is configured to obtain and process the description element from such web page. In another example, a client device provides a description to a server or another client device using an e-mail, wherein the server or the client device is configured to obtain the e-mail and process the title element from the e-mail. In another example, a client device enters a description into a description element of an applet executing on the client device, wherein a server or another client device is configured to obtain and processes the title.

At block 1305, the method 1300 can use a client device to set a date or time for the conference event hosted by a server or another client device by using a web page, an applet, a voice message, a text message, an e-mail, or any combination thereof. In one example, a client device sets the date or time of the conference event by entering the date or time into a date or time element on a web page hosted by a server or another client device, wherein the server or the other client device is configured to obtain and process the date or time element from the web page. In another example, a client device sends a date or time element to a server or another client device using an e-mail, wherein the server or the other client device is configured to obtain the e-mail and process the date or time element from such e-mail. In another example, a client device inputs the date or time into a date or time element of an applet executing on the client device, wherein a server or another client device is configured to obtain and process the date and time.

At block 1307, the method 1300 can use a client device to set a fee to be paid by each participant, set an attendance budget, set an attendance limit, or any combination thereof for the conference event hosted by a server or another client device using a web page, an applet, a voice message, a text message, an e-mail, or any combination thereof. The fee to be paid by each participant can be set for all participants or for a class of participants. In one example, a client device sets the fee to be paid by each participant of the conference event by entering an amount into a participant fee element on a web page hosted by a server or another client device, wherein the server or the other client device is configured to obtain and process the participant fee element from the web page. In another example, a client device sets the fee to be paid by each participant of the conference event by entering an amount into a ticket price element in an e-mail and sending the e-mail to a server or another client device, wherein the server or the other client device is configured to obtain the e-mail and process the ticket price element from the e-mail. In another example, a client device inputs the fee to be paid by each participant of the conference event by entering an amount into a participant fee element using an applet executing on a client device, wherein a server or another client device is configured to obtain and process the fee sent by the client device via the applet. In another example, a client device sets a first fee for a first class of participants such as members of a community and sets a second fee for a second class of participants such as non-members of the community. In another example, a client device does not charge a fee for a first class of participants such as members of a community and sets a fee for a second class of participants such as non-members of the community.

Further, the method 1300 can use a client device to set an attendance limit for the conference event hosted by a server or another client device using a web page, an applet, a voice message, a text message, an e-mail, or any combination thereof. A client device can set the attendance limit for the conference event by setting, for instance, a minimum required number of participants registered for the conference event to allow the conference event to occur. In one example, a client device sets the attendance limit of the conference event by entering a minimum required number of participants such as twenty participants into an attendance limit element of a web page hosted by a server or another client device, wherein the server or the other client device is configured to obtain and process the attendance limit element from the web page. In another example, a client device sets the attendance limit for the conference event by entering a minimum required number of participants into an attendance limit element of an e-mail and sending the e-mail to a server or another client device, wherein the server or the other client device is configured to obtain the e-mail and process the attendance limit element from the e-mail. In another example, a client device inputs the attendance limit for the conference event by entering a minimum required number of participants into an attendance limit element of an applet executing on the client device, wherein a server or another client device is configured to obtain and process the attendance limit element sent by the client device via the applet.

In addition, the method 1300 can use a client device to set an attendance budget for the conference event hosted by a server or another client device using a web page, an applet, a voice message, a text message, an e-mail, or any combination thereof. A client device can set the attendance budget for the conference event by setting, for instance, a minimum required amount of revenues for the conference event to allow it to occur. In one example, a client device sets an attendance budget of the conference event by entering a minimum required amount of revenues into an attendance budget element on a web page hosted by a server or another client device, wherein the server or the other client device is configured to obtain and process the attendance budget element from the web page. In another example, a client device sets the attendance budget for the conference event by entering a minimum required amount of revenues into an attendance budget element of an e-mail and sending the e-mail to a server or a client device, wherein the server or the other client device is configured to obtain the e-mail and process the attendance budget element from the e-mail. In another example, a client device inputs the attendance budget for the conference event by entering a minimum required amount of revenues into an attendance budget element of an applet executing on the client device, wherein a server or another client device is configured to obtain and process the attendance budget sent by the client device via the applet.

At block 1309, the method 1300 can use a client device to set a participant criteria for the conference event hosted by a server or another client device using a web page, an applet, a voice message, a text message, an e-mail, or any combination thereof. The participant criteria can be, for instance, a language the conference event will be conducted in, a profession the conference event is targeted towards, or any other demographics or combination of demographics. In one example, a client device sets the participant criteria for the conference event by selecting the English language selection element on a web page hosted by the server or other client device, wherein the server or the other client device is configured to obtain and process the selection element from the web page. In another example, a client device sets the participant criteria for the conference event by identifying that the conference event is targeted towards accountants using a participant criteria element in an e-mail and sending the e-mail to a server or another client device, wherein the server or the other client device is configured to obtain the e-mail and process the participant criteria element from the e-mail. In another example, a client device inputs the participant criteria for the conference event by entering a keyword tag to allow a prospective participant to identify the conference event using an applet executing on the client device, wherein a server or another client device is configured to obtain and process the keyword tag sent by the client device via the applet.

At block 1311, the method 1300 can use a client device to set a task for the participants to complete for the conference event hosted by a server or another client device. A client device can send recommendations or requirements for the completion of certain tasks by each participant prior to, contemporaneous with, or after the conference event from a client device to a server or another client device using a web page, an applet, a voice message, a text message, an e-mail, or any combination thereof. In one example, a client device sends to a server or another client device a recommendation that each participant read a specific document in preparation of the conference event. In another example, a client device sends to a server or another client device a requirement that each participant complete a participant evaluation after the conference event, wherein a server or another client device receives the participant evaluation from the client device prior to or contemporaneous with the conference event, provides the participant evaluation to the participants via their client devices contemporaneous with or after the conference event, and receives the completed participant evaluations from the participants via their client devices contemporaneous with or after the conference event. In another example, a client device requires the participants to answer questions during the conference event using an applet executing on each participant's client device, wherein a server or another client device is configured to send and receive the questions to and from each participant's client device prior to or contemporaneous with the conference event.

At block 1313, the method 1300 can use a client device to market the conference event hosted by a server or another client device by, for instance, posting information about the conference event to a social networking site such as Facebook®, Twitter® and LinkedIn®, distributed using e-mail, advertise using banner ads, other similar marketing techniques, or any combination thereof. Further, the marketing of the conference event can use keyword tags to identify prospective participants such as correlating the keyword tags with the likes or dislikes of each prospective participant. Also, the marketing of the conference event can use the conference event histories of prospective participants for targeted e-mail advertisements. For example, a client device can market the conference event by providing a hypertext link on a web page hosted by a server or another client device, wherein the server or the other client device is configured to use the hypertext link to post the conference event on his or her Facebook® page. In another example, a client device can enter a keyword tag associated with the conference event on a web page hosted by a server or another client device, wherein the server or the other client device is configured to use the keyword tag to identify a prospective participant using his or her profile information. Once a prospective participant is identified, the server or other client device can send an e-mail to the prospective participant notifying him or her of the conference event.

At block 1315, the method 1300 can use a client device to participate in the conference event hosted by a server or another client device using, for instance, voice, video, an avatar, a text message, a desktop capture, an electronic presentation, other similar communication, or any combination thereof. The voice can be captured by a microphone, converted to a digital voice signal, and sent from a client device to a server or another client device. Similarly, the video can be captured by a camera, converted to a digital video signal, and sent from a client device to a server or another client device.

At block 1317, the method 1300 can use a client device to receive a participant evaluation from each participant of the conference event hosted by a server or another client device. A client device can receive each participant evaluation from a server or another client device via a web page, an applet, a voice message, a text message, an e-mail, or any combination thereof. In one example, a client device downloads each participant evaluation form from a server or another client device using a web page hosted by the server or other client device. In another example, a client device receives each participant evaluation form from a server or another client device using an e-mail, wherein the client device is configured to receive the e-mail and process each participant evaluation form from the e-mail. In another example, a client device receives each participant evaluation form from a server or another client device using an applet running on the client device, wherein the client device is configured to obtain and process each participant evaluation form.

At block 1319, the method 1300 can use a client device to receive a fee from each participant of the conference event hosted by a server or another client device. The fee from each participant can be paid prior to, contemporaneous with, or after the conference event. The fee can be paid via a check, a wire transfer, a credit card transaction such as Visa®, an online payment service such as PayPal®, another payment method, or any combination thereof. Further, notice of the fee payment can be provided electronically to a client device from a server or another client device. Also, a client device can monitor an account such as a PayPal® account for any payments. At block 1321, the method 1300 can release to a host, an organizer, a sponsor, a presenter, a community, a charity, an organization, an individual, or any combination thereof the accumulated fees paid by the participants using a client device to a server or another client device. Further, the accumulated fees can be released by a server or another client device using a client device after, for instance, a certain period of time, review of the participant evaluations, other method, or combination of methods.

Figure 14:
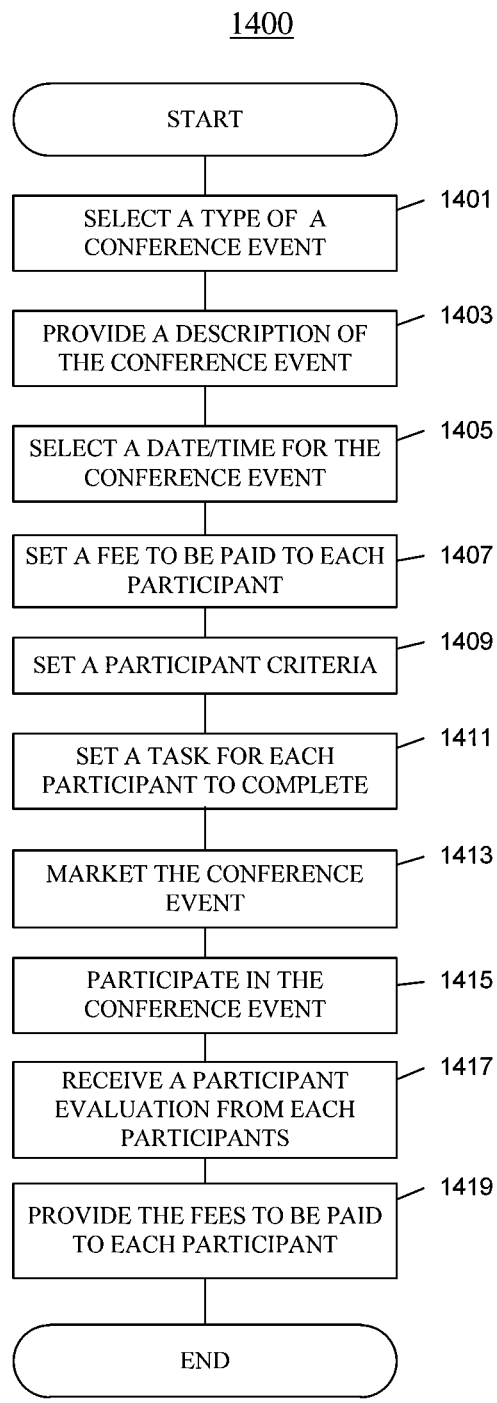
FIG. 14 is a flowchart illustrating another embodiment of a method of using a client device to perform a conference event hosted by a server or another client device in accordance with various aspects set forth herein.

FIG. 14 is a flowchart illustrating another embodiment of a method 1400 of using a client device to perform a conference event hosted by a server or another client device in accordance with various aspects set forth herein. In FIG. 14, the method 1400 can start at, for instance, block 1401, where the method 1400 can use a client device to select a type of conference event hosted by a server or another client device. The type of conference event can be selected by a client device via a server or another client device using a web page, an applet, a voice message, a text message, an e-mail, or any combination thereof. In one example, a client device selects an open to the public selection element on a web page hosted by a server or another client device, wherein the server or the other client device is configured to obtain and process such selection element from the web page. In another example, a client device sends an open to members only selection element to a server or another client device using an e-mail, wherein the server or the other client device is configured to obtain and process such selection element from the e-mail. In another example, a client device inputs a private by invite only selection element using an applet, wherein a server or another client device is configured to obtain and process such selection element. Further, the type of conference event can include whether the conference event allows some, none, or all of the participants to be a moderator. For example, a client device selects on a web page hosted by a server or another client device a selection element to allow all participants to be a moderator, wherein the server or the other client device is configured to obtain and process such selection element from the web page. In another example, a client device sends to a server or another client device using an e-mail a selection element to allow only members of a club to be a moderator, wherein the server or the other client device is configured to obtain and process such selection element from the e-mail. In another example, a client device sends to a server or another client device using an applet a selection element to allow only a presenter to be a moderator, wherein the server or the other client device is configured to obtain and process such selection element.

In FIG. 14, at block 1403, the method 1400 can use a client device to provide a description of the conference event hosted by a server or another client device by, for instance, uploading an image file of the conference event, providing a title of the conference event, providing a description of the conference event, or any combination thereof. A client device can provide the image, title, description, or any combination thereof to a server or another client device via a web page, an applet, a voice message, a text message, an e-mail, or any combination thereof. The image can be used to, for instance, allow potential participants to identify the conference event or further market the conference event. In one example, a client device uploads the image file to a server or another client device using a web page hosted by the server or the client device, wherein the server or the client device is configured to obtain and process the image file from the web page. In another example, a client device uploads the image file to a server or another client device using an e-mail, wherein the server or the other client device is configured to obtain the e-mail and process the image file from the e-mail. In another example, a client device uploads the image file to a server or another client device via an applet executing on the client device, wherein the server or the other client device is configured to obtain and process the image file.

Further, the title can be used to identify the conference event. In one example, a client device inputs the title into a title element on a web page hosted by a server or another client device, wherein the server or the other client device is configured to obtain and process the title element from the web page. In another example, a client device enters the title into a title element in an e-mail and sends the e-mail to a server or another client device, wherein the server or the other client device is configured to obtain the e-mail and process the title element from the e-mail. In another example, a client device enters the title into a title element of an applet executing on a client device, wherein a server or another client device is configured to obtain and process the title. Also, a client device can provide a description of the conference event. In one example, a client device enters a description into a description element on a web page hosted by a server or another client device, wherein the server or the other client device is configured to obtain and process the description element from such web page. In another example, a client device provides a description to a server or another client device using an e-mail, wherein the server or the client device is configured to obtain the e-mail and process the title element from the e-mail. In another example, a client device enters a description into a description element of an applet executing on the client device, wherein a server or another client device is configured to obtain and processes the title.

At block 1405, the method 1400 can use a client device to set a date or time for the conference event hosted by a server or another client device by using a web page, an applet, a voice message, a text message, an e-mail, or any combination thereof. In one example, a client device sets the date or time of the conference event by entering the date or time into a date or time element on a web page hosted by a server or another client device, wherein the server or the other client device is configured to obtain and process the date or time element from the web page. In another example, a client device sends a date or time element to a server or another client device using an e-mail, wherein the server or the other client device is configured to obtain the e-mail and process the date or time element from such e-mail. In another example, a client device inputs the date or time into a date or time element of an applet executing on the client device, wherein a server or another client device is configured to obtain and process the date and time.

At block 1407, the method 400 can use a client device to set a fee to be paid to each participant or an attendance limit for a conference event hosted by a server or another client device using a web page, an applet, a voice message, a text message, an e-mail, or any combination thereof. The fee to be paid to each participant can be set for all participants or for a class of participants. In one example, a client device sets the fee to be paid to each participant of the conference event by entering an amount into a participant paid element on a web page hosted by a server or another client device, wherein the server or the other client device is configured to obtain and process the participant paid element from the web page. In another example, a client device sets the fee to be paid to each participant of the conference event by entering an amount into a participant paid element in an e-mail and sending the e-mail to a server or another client device, wherein the server is configured to obtain the e-mail and process the participant paid element from the e-mail. In another example, a user inputs the fee to be paid to each participant of the conference event by entering a fee into a participant paid element of an applet executing on a client device, wherein a server or another client device is configured to obtain and process the participant paid element. In another example, a client device sets a first fee to be paid to a first class of participants such as members of a community and sets a second fee to be paid to a second class of participants such as non-members of the community.

Further, the method 1400 can use a client device to set an attendance limit for the conference event hosted by a server or another client device using a web page, an applet, a voice message, a text message, an e-mail, or any combination thereof. A client device can set the attendance limit for the conference event by setting, for instance, a minimum required number of participants registered for the conference event to allow the conference event to occur. In one example, a client device sets the attendance limit of the conference event by entering a minimum required number of participants such as twenty participants into an attendance limit element of a web page hosted by a server or another client device, wherein the server or the other client device is configured to obtain and process the attendance limit element from the web page. In another example, a client device sets the attendance limit for the conference event by entering a minimum required number of participants into an attendance limit element of an e-mail and sending the e-mail to a server or another client device, wherein the server or the other client device is configured to obtain the e-mail and process the attendance limit element from the e-mail. In another example, a client device inputs the attendance limit for the conference event by entering a minimum required number of participants into an attendance limit element of an applet executing on the client device, wherein a server or another client device is configured to obtain and process the attendance limit element sent by the client device via the applet.

At block 1409, the method 1400 can use a client device to set a participant criteria for the conference event hosted by a server or another client device using a web page, an applet, a voice message, a text message, an e-mail, or any combination thereof. The participant criteria can be, for instance, a language the conference event will be conducted in, a profession the conference event is targeted towards, or any other demographics or combination of demographics. In one example, a client device sets the participant criteria for the conference event by selecting the English language selection element on a web page hosted by the server or other client device, wherein the server or the other client device is configured to obtain and process the selection element from the web page. In another example, a client device sets the participant criteria for the conference event by identifying that the conference event is targeted towards accountants using a participant criteria element in an e-mail and sending the e-mail to a server or another client device, wherein the server or the other client device is configured to obtain the e-mail and process the participant criteria element from the e-mail. In another example, a client device inputs the participant criteria for the conference event by entering a keyword tag to allow a prospective participant to identify the conference event using an applet executing on the client device, wherein a server or another client device is configured to obtain and process the keyword tag sent by the client device via the applet.

At block 1411, the method 1400 can use a client device to set a task for the participants to complete for the conference event hosted by a server or another client device. A client device can send recommendations or requirements for the completion of certain tasks by each participant prior to, contemporaneous with, or after the conference event from a client device to a server or another client device using a web page, an applet, a voice message, a text message, an e-mail, or any combination thereof. In one example, a client device recommends that each participant reads a specific document in preparation of the conference event. In another example, a client device requires the participants to complete a participant evaluation after the conference event, wherein a server or another client device receives the participant evaluation from the client device prior to or contemporaneous with the conference event, provides the participant evaluation to the participants via their client devices contemporaneous with or after the conference event, and receives the completed participant evaluations from the participants via their client devices contemporaneous with or after the conference event. In another example, a client device requires the participants to answer questions during the conference event using an applet executing on each participant's client device, wherein a server or another client device is configured to send and receive the questions to and from each participant's client device prior to or contemporaneous with the conference event.

At block 1413, the method 1400 can use a client device to market the conference event hosted by a server or another client device by, for instance, posting information about the conference event to a social networking site such as Facebook®, Twitter® and LinkedIn®, distributed using e-mail, advertise using banner ads, other similar marketing techniques, or any combination thereof. Further, the marketing of the conference event can use keyword tags to identify prospective participants such as correlating the keyword tags with the likes or dislikes of each prospective participant. Also, the marketing of the conference event can use the conference event histories of prospective participants for targeted e-mail advertisements. For example, a client device can market the conference event by providing a hypertext link on a web page hosted by a server or another client device, wherein the server or the other client device is configured to use the hypertext link to post the conference event on his or her Facebook® page. In another example, a client device can enter a keyword tag associated with the conference event on a web page hosted by a server or another client device, wherein the server or the other client device is configured to use the keyword tag to identify a prospective participant using his or her profile information. Once a prospective participant is identified, the server or other client device can send an e-mail to the prospective participant notifying him or her of the conference event.

At block 1415, the method 1400 can use a client device to participate in the conference event hosted by a server or another client device using, for instance, voice, video, an avatar, a text message, a desktop capture, an electronic presentation, other similar communication, or any combination thereof. The voice can be captured by a microphone, converted to a digital voice signal, and sent from a client device to a server or another client device. Similarly, the video can be captured by a camera, converted to a digital video signal, and sent from a client device to a server or another client device.

At block 1417, the method 1400 can use a client device to receive a participant evaluation from each participant of the conference event hosted by a server or another client device. A client device can receive each participant evaluation from a server or another client device via a web page, an applet, a voice message, a text message, an e-mail, or any combination thereof. In one example, a client device downloads each participant evaluation form from a server or another client device using a web page hosted by the server or other client device. In another example, a client device receives each participant evaluation form from a server or another client device using an e-mail, wherein the client device is configured to receive the e-mail and process each participant evaluation form from the e-mail. In another example, a client device receives each participant evaluation form from a server or another client device using an applet running on the client device, wherein the client device is configured to obtain and process each participant evaluation form.

At block 1419, the method 1400 can use a client device to provide the total fees to be paid to each participant of the conference event hosted by a server or another client device. The total fees to be paid to each participant can be paid prior to, contemporaneous with, or after the conference event. The total fees can be paid via a check, a wire transfer, a credit card transaction such as Visa®, an online payment service such as PayPal®, another payment method, or any combination thereof. Further, notice of the total fees payment can be provided electronically to the client device from a server or another client device.

Figure 15:
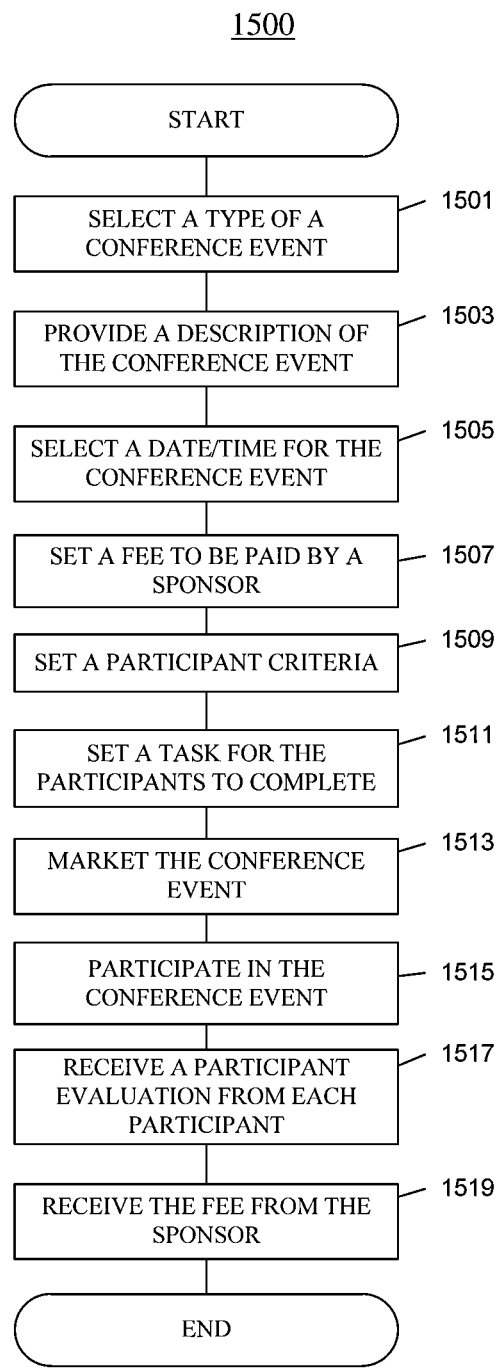
FIG. 15 is a flowchart illustrating another embodiment of a method of using a client device to perform a conference event hosted by a server or another client device in accordance with various aspects set forth herein.

FIG. 15 is a flowchart illustrating another embodiment of a method 1500 of using a client device to perform a conference event hosted by a server or another client device in accordance with various aspects set forth herein. In FIG. 15, the method 1500 can start at, for instance, block 1501, where the method 1500 can use a client device to select a type of conference event hosted by a server or another client device. The type of conference event can be selected by a client device via a server or another client device using a web page, an applet, a voice message, a text message, an e-mail, or any combination thereof. In one example, a client device selects an open to the public selection element on a web page hosted by a server or another client device, wherein the server or the other client device is configured to obtain and process such selection element from the web page. In another example, a client device sends an open to members only selection element to a server or another client device using an e-mail, wherein the server or the other client device is configured to obtain and process such selection element from the e-mail. In another example, a client device inputs a private by invite only selection element using an applet, wherein a server or another client device is configured to obtain and process such selection element. Further, the type of conference event can include whether the conference event allows some, none, or all of the participants to be a moderator. For example, a client device selects on a web page hosted by a server or another client device a selection element to allow all participants to be a moderator, wherein the server or the other client device is configured to obtain and process such selection element from the web page. In another example, a client device sends to a server or another client device using an e-mail a selection element to allow only members of a club to be a moderator, wherein the server or the other client device is configured to obtain and process such selection element from the e-mail. In another example, a client device sends to a server or another client device using an applet a selection element to allow only a presenter to be a moderator, wherein the server or the other client device is configured to obtain and process such selection element.

In FIG. 15, at block 1503, the method 1500 can use a client device to provide a description of the conference event hosted by a server or another client device by, for instance, uploading an image file of the conference event, providing a title of the conference event, providing a description of the conference event, or any combination thereof. A client device can provide the image, title, description, or any combination thereof to a server or another client device via a web page, an applet, a voice message, a text message, an e-mail, or any combination thereof. The image can be used to, for instance, allow potential participants to identify the conference event or further market the conference event. In one example, a client device uploads the image file to a server or another client device using a web page hosted by the server or the client device, wherein the server or the client device is configured to obtain and process the image file from the web page. In another example, a client device uploads the image file to a server or another client device using an e-mail, wherein the server or the other client device is configured to obtain the e-mail and process the image file from the e-mail. In another example, a client device uploads the image file to a server or another client device via an applet executing on the client device, wherein the server or the other client device is configured to obtain and process the image file.

Further, the title can be used to identify the conference event. In one example, a client device inputs the title into a title element on a web page hosted by a server or another client device, wherein the server or the other client device is configured to obtain and process the title element from the web page. In another example, a client device enters the title into a title element in an e-mail and sends the e-mail to a server or another client device, wherein the server or the other client device is configured to obtain the e-mail and process the title element from the e-mail. In another example, a client device enters the title into a title element of an applet executing on a client device, wherein a server or another client device is configured to obtain and process the title. Also, a client device can provide a description of the conference event. In one example, a client device enters a description into a description element on a web page hosted by a server or another client device, wherein the server or the other client device is configured to obtain and process the description element from such web page. In another example, a client device provides a description to a server or another client device using an e-mail, wherein the server or the client device is configured to obtain the e-mail and process the title element from the e-mail. In another example, a client device enters a description into a description element of an applet executing on the client device, wherein a server or another client device is configured to obtain and processes the title.

At block 1505, the method 1500 can use a client device to set a date or time for the conference event hosted by a server or another client device by using a web page, an applet, a voice message, a text message, an e-mail, or any combination thereof. In one example, a client device sets the date or time of the conference event by entering the date or time into a date or time element on a web page hosted by a server or another client device, wherein the server or the other client device is configured to obtain and process the date or time element from the web page. In another example, a client device sends a date or time element to a server or another client device using an e-mail, wherein the server or the other client device is configured to obtain the e-mail and process the date or time element from such e-mail. In another example, a client device inputs the date or time into a date or time element of an applet executing on the client device, wherein a server or another client device is configured to obtain and process the date and time.

At block 1507, the method 1500 can use a client device to set a fee to be paid by a sponsor of the conference event hosted by a server or another client device using a web page, an applet, a voice message, a text message, an e-mail, or any combination thereof. The fee to be paid by a sponsor of the conference event can be used to pay a host, an organizer, a presenter, a community, a charity, an organization, an individual, or any combination thereof. In one example, a client device sets the fee to be paid by a sponsor of the conference event by entering an amount into a sponsor fee element on a web page hosted by a server or another client device, wherein the server or the other client device is configured to obtain and process the sponsor fee element from the web page. In another example, a client device sets the fee to be paid by a sponsor of the conference event by entering an amount into a sponsor fee element in an e-mail and sending the e-mail to a server or another client device, wherein the server or the other client device is configured to obtain the e-mail and process the sponsor fee element from the e-mail. In another example, a client device inputs the fee to be paid by a sponsor of the conference event by entering an amount into a sponsor fee element of an applet executing on the client device, wherein a server or another client device is configured to obtain and process the fee sent by the applet. In another example, a client device sets a first fee to be paid to a first presenter and sets a second fee to be paid to a second presenter.

At block 1509, the method 1500 can use a client device to set a participant criteria for the conference event hosted by a server or another client device using a web page, an applet, a voice message, a text message, an e-mail, or any combination thereof. The participant criteria can be, for instance, a language the conference event will be conducted in, a profession the conference event is targeted towards, or any other demographics or combination of demographics. In one example, a client device sets the participant criteria for the conference event by selecting the English language selection element on a web page hosted by the server or other client device, wherein the server or the other client device is configured to obtain and process the selection element from the web page. In another example, a client device sets the participant criteria for the conference event by identifying that the conference event is targeted towards accountants using a participant criteria element in an e-mail and sending the e-mail to a server or another client device, wherein the server or the other client device is configured to obtain the e-mail and process the participant criteria element from the e-mail. In another example, a client device inputs the participant criteria for the conference event by entering a keyword tag to allow a prospective participant to identify the conference event using an applet executing on the client device, wherein a server or another client device is configured to obtain and process the keyword tag sent by the client device via the applet.

At block 1511, the method 1500 can use a client device to set a task for the participants to complete for the conference event hosted by a server or another client device. A client device can send recommendations or requirements for the completion of certain tasks by each participant prior to, contemporaneous with, or after the conference event from a client device to a server or another client device using a web page, an applet, a voice message, a text message, an e-mail, or any combination thereof. In one example, a client device recommends that each participant reads a specific document in preparation of the conference event. In another example, a client device requires the participants to complete a participant evaluation after the conference event, wherein a server or another client device receives the participant evaluation from the client device prior to or contemporaneous with the conference event, provides the participant evaluation to the participants via their client devices contemporaneous with or after the conference event, and receives the completed participant evaluations from the participants via their client devices contemporaneous with or after the conference event. In another example, a client device requires the participants to answer questions during the conference event using an applet executing on each participant's client device, wherein a server or another client device is configured to send and receive the questions to and from each participant's client device prior to or contemporaneous with the conference event.

At block 1513, the method 1500 can use a client device to market the conference event hosted by a server or another client device by, for instance, posting information about the conference event to a social networking site such as Facebook®, Twitter® and LinkedIn®, distributed using e-mail, advertise using banner ads, other similar marketing techniques, or any combination thereof. Further, the marketing of the conference event can use keyword tags to identify prospective participants such as correlating the keyword tags with the likes or dislikes of each prospective participant. Also, the marketing of the conference event can use the conference event histories of prospective participants for targeted e-mail advertisements. For example, a client device can market the conference event by providing a hypertext link on a web page hosted by a server or another client device, wherein the server or the other client device is configured to use the hypertext link to post the conference event on his or her Facebook® page. In another example, a client device can enter a keyword tag associated with the conference event on a web page hosted by a server or another client device, wherein the server or the other client device is configured to use the keyword tag to identify a prospective participant using his or her profile information. Once a prospective participant is identified, the server or other client device can send an e-mail to the prospective participant notifying him or her of the conference event.

At block 1515, the method 1500 can use a client device to participate in the conference event hosted by a server or another client device using, for instance, voice, video, an avatar, a text message, a desktop capture, an electronic presentation, other similar communication, or any combination thereof. The voice can be captured by a microphone, converted to a digital voice signal, and sent from a client device to a server or another client device. Similarly, the video can be captured by a camera, converted to a digital video signal, and sent from a client device to a server or another client device.

At block 1517, the method 1500 can use a client device to receive a participant evaluation from each participant of the conference event hosted by a server or another client device. A client device can receive each participant evaluation from a server or another client device via a web page, an applet, a voice message, a text message, an e-mail, or any combination thereof. In one example, a client device downloads each participant evaluation form from a server or another client device using a web page hosted by the server or other client device. In another example, a client device receives each participant evaluation form from a server or another client device using an e-mail, wherein the client device is configured to receive the e-mail and process each participant evaluation form from the e-mail. In another example, a client device receives each participant evaluation form from a server or another client device using an applet running on the client device, wherein the client device is configured to obtain and process each participant evaluation form.

At block 1519, the method 1500 can use a client device to receive the fee from the sponsor of the conference event hosted by a server or another client device to be paid to a host, an organizer, a presenter, a community, a charity, an organization, an individual, or any combination thereof. The fee from the sponsor can be received prior to, contemporaneous with, or after the conference event.

Figure 16:
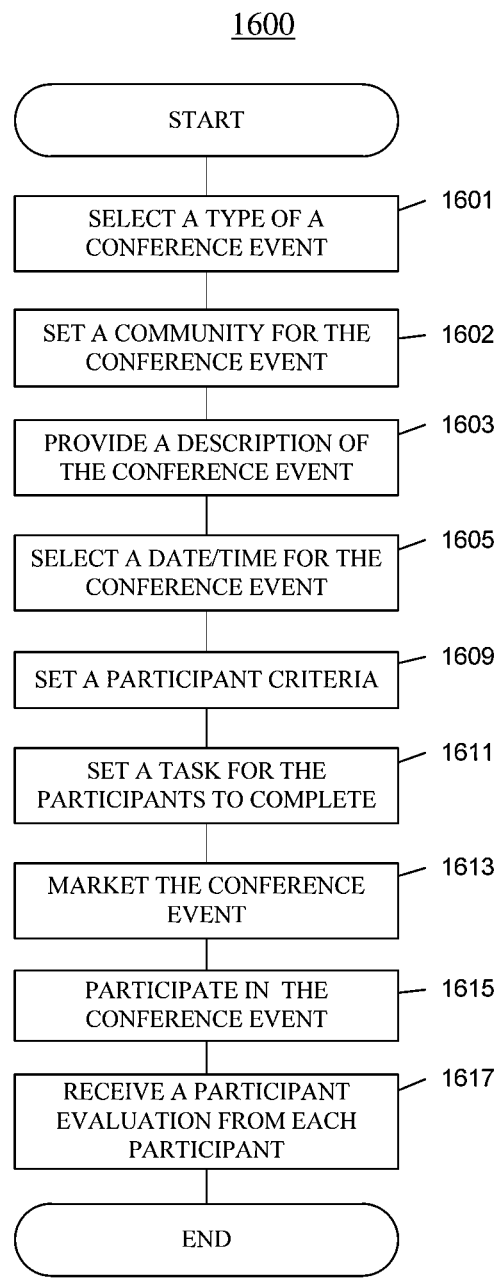
FIG. 16 is a flowchart illustrating another embodiment of a method of using a client device to perform a conference event hosted by a server or another client device in accordance with various aspects set forth herein.

FIG. 16 is a flowchart illustrating another embodiment of a method 1600 of using a client device to perform a conference event hosted by a server or another client device in accordance with various aspects set forth herein. In FIG. 16, the method 1600 can start at, for instance, block 1601, where it can use a client device to select a type of conference event hosted by a server or another client device. The type of conference event can be selected by a client device via a server or another client device using a web page, an applet, a voice message, a text message, an e-mail, or any combination thereof. In one example, a client device selects an open to the public selection element on a web page hosted by a server or another client device, wherein the server or the other client device is configured to obtain and process such selection element from the web page. In another example, a client device sends an open to members only selection element to a server or another client device using an e-mail, wherein the server or the other client device is configured to obtain and process such selection element from the e-mail. In another example, a client device inputs a private by invite only selection element using an applet, wherein a server or another client device is configured to obtain and process such selection element. Further, the type of conference event can include whether the conference event allows some, none, or all of the participants to be a moderator. For example, a client device selects on a web page hosted by a server or another client device a selection element to allow all participants to be a moderator, wherein the server or the other client device is configured to obtain and process such selection element from the web page. In another example, a client device sends to a server or another client device using an e-mail a selection element to allow only members of a club to be a moderator, wherein the server or the other client device is configured to obtain and process such selection element from the e-mail. In another example, a client device sends to a server or another client device using an applet a selection element to allow only a presenter to be a moderator, wherein the server or the other client device is configured to obtain and process such selection element.

At block 1602, the method 1600 can use a client device to set a community for the conference event hosted by a server or another client device using a web page, an applet, a voice message, a text message, an e-mail, or any combination thereof. The community can be a user, a club, a charity, an organization, a company, an association, a partnership, a fraternity, a sorority, a group, an affiliation, a cooperative, a corporation, a fellowship, a society, a union, other type of community, or any combination thereof. In one example, a client device sets a community for the conference event by selecting a bible study group on a web page hosted by a server or another client device, wherein the server or the other client device is configured to obtain and process such selection from the web page. In another example, a client device sets a community for the conference event by selecting a chess club on a web page hosted by a server or another client device, wherein the server or the other client device is configured to obtain and process the selection from the web page. In another example, a client device sets a community for the conference event by selecting a company using an applet executing on the client device, wherein a server or another client device is configured to obtain and process the selection sent by the applet.

At block 1603, the method 1600 can use a client device to provide a description of the conference event hosted by a server or another client device by, for instance, uploading an image file of the conference event, providing a title of the conference event, providing a description of the conference event, or any combination thereof. A client device can provide the image, title, description, or any combination thereof to a server or another client device via a web page, an applet, a voice message, a text message, an e-mail, or any combination thereof. The image can be used to, for instance, allow potential participants to identify the conference event or further market the conference event. In one example, a client device uploads the image file to a server or another client device using a web page hosted by the server or the client device, wherein the server or the client device is configured to obtain and process the image file from the web page. In another example, a client device uploads the image file to a server or another client device using an e-mail, wherein the server or the other client device is configured to obtain the e-mail and process the image file from the e-mail. In another example, a client device uploads the image file to a server or another client device via an applet executing on the client device, wherein the server or the other client device is configured to obtain and process the image file.

Further, the title can be used to identify the conference event. In one example, a client device inputs the title into a title element on a web page hosted by a server or another client device, wherein the server or the other client device is configured to obtain and process the title element from the web page. In another example, a client device enters the title into a title element in an e-mail and sends the e-mail to a server or another client device, wherein the server or the other client device is configured to obtain the e-mail and process the title element from the e-mail. In another example, a client device enters the title into a title element of an applet executing on a client device, wherein a server or another client device is configured to obtain and process the title. Also, a client device can provide a description of the conference event. In one example, a client device enters a description into a description element on a web page hosted by a server or another client device, wherein the server or the other client device is configured to obtain and process the description element from such web page. In another example, a client device provides a description to a server or another client device using an e-mail, wherein the server or the client device is configured to obtain the e-mail and process the title element from the e-mail. In another example, a client device enters a description into a description element of an applet executing on the client device, wherein a server or another client device is configured to obtain and processes the title.

At block 1605, the method 1600 can use a client device to set a date or time for the conference event hosted by a server or another client device by using a web page, an applet, a voice message, a text message, an e-mail, or any combination thereof. In one example, a client device sets the date or time of the conference event by entering the date or time into a date or time element on a web page hosted by a server or another client device, wherein the server or the other client device is configured to obtain and process the date or time element from the web page. In another example, a client device sends a date or time element to a server or another client device using an e-mail, wherein the server or the other client device is configured to obtain the e-mail and process the date or time element from such e-mail. In another example, a client device inputs the date or time into a date or time element of an applet executing on the client device, wherein a server or another client device is configured to obtain and process the date and time.

At block 1609, the method 1600 can use a client device to set a participant criteria for the conference event hosted by a server or another client device using a web page, an applet, a voice message, a text message, an e-mail, or any combination thereof. The participant criteria can be, for instance, a language the conference event will be conducted in, a profession the conference event is targeted towards, or any other demographics or combination of demographics. In one example, a client device sets the participant criteria for the conference event by selecting the English language selection element on a web page hosted by the server or other client device, wherein the server or the other client device is configured to obtain and process the selection element from the web page. In another example, a client device sets the participant criteria for the conference event by identifying that the conference event is targeted towards accountants using a participant criteria element in an e-mail and sending the e-mail to a server or another client device, wherein the server or the other client device is configured to obtain the e-mail and process the participant criteria element from the e-mail. In another example, a client device inputs the participant criteria for the conference event by entering a keyword tag to allow a prospective participant to identify the conference event using an applet executing on the client device, wherein a server or another client device is configured to obtain and process the keyword tag sent by the client device via the applet.

At block 1611, the method 1600 can use a client device to set a task for the participants to complete for the conference event hosted by a server or another client device. A client device can send recommendations or requirements for the completion of certain tasks by each participant prior to, contemporaneous with, or after the conference event from a client device to a server or another client device using a web page, an applet, a voice message, a text message, an e-mail, or any combination thereof. In one example, a client device recommends that each participant reads a specific document in preparation of the conference event. In another example, a client device requires the participants to complete a participant evaluation after the conference event, wherein a server or another client device receives the participant evaluation from the client device prior to or contemporaneous with the conference event, provides the participant evaluation to the participants via their client devices contemporaneous with or after the conference event, and receives the completed participant evaluations from the participants via their client devices contemporaneous with or after the conference event. In another example, a client device requires the participants to answer questions during the conference event using an applet executing on each participant's client device, wherein a server or another client device is configured to send and receive the questions to and from each participant's client device prior to or contemporaneous with the conference event.

At block 1613, the method 1600 can use a client device to market the conference event hosted by a server or another client device by, for instance, posting information about the conference event to a social networking site such as Facebook®, Twitter® and LinkedIn®, distributed using e-mail, advertise using banner ads, other similar marketing techniques, or any combination thereof. Further, the marketing of the conference event can use keyword tags to identify prospective participants such as correlating the keyword tags with the likes or dislikes of each prospective participant. Also, the marketing of the conference event can use the conference event histories of prospective participants for targeted e-mail advertisements. For example, a client device can market the conference event by providing a hypertext link on a web page hosted by a server or another client device, wherein the server or the other client device is configured to use the hypertext link to post the conference event on his or her Facebook® page. In another example, a client device can enter a keyword tag associated with the conference event on a web page hosted by a server or another client device, wherein the server or the other client device is configured to use the keyword tag to identify a prospective participant using his or her profile information. Once a prospective participant is identified, the server or other client device can send an e-mail to the prospective participant notifying him or her of the conference event.

At block 1615, the method 1600 can use a client device to participate in the conference event hosted by a server or another client device using, for instance, voice, video, an avatar, a text message, a desktop capture, an electronic presentation, other similar communication, or any combination thereof. The voice can be captured by a microphone, converted to a digital voice signal, and sent from a client device to a server or another client device. Similarly, the video can be captured by a camera, converted to a digital video signal, and sent from a client device to a server or another client device.

At block 1617, the method 1600 can use a client device to receive a participant evaluation from each participant of the conference event hosted by a server or another client device. A client device can receive each participant evaluation from a server or another client device via a web page, an applet, a voice message, a text message, an e-mail, or any combination thereof. In one example, a client device downloads each participant evaluation form from a server or another client device using a web page hosted by the server or other client device. In another example, a client device receives each participant evaluation form from a server or another client device using an e-mail, wherein the client device is configured to receive the e-mail and process each participant evaluation form from the e-mail. In another example, a client device receives each participant evaluation form from a server or another client device using an applet running on the client device, wherein the client device is configured to obtain and process each participant evaluation form.

As discussed previously, a master server may be a computer program running on a computer hardware system that serves the requests of a client program, wherein the client program may either run on the same computer hardware system or connect via a network from, for instance, another computer hardware system or client devices. Similarly, a secondary server may be a computer program running on a computer hardware system that serves the requests of a client program, wherein the client program may either run on the same computer hardware system or connect via the network from, for instance, another computer hardware system or the client devices. Further, the secondary server may be a client program to the master server. For example, the master server may be the master of the conference event and the secondary server may be a client program to the master server, wherein the secondary server is used to support additional client programs running on client devices in a conference event. In another example, the master server and the secondary server may run on the same computer hardware system. In another example, the master server and the secondary server may run on different computer hardware systems. The master server may initiate the creation of the secondary server to, for instance, host additional participants in a conference event, wherein the master server may host a portion of the participants of the conference event and the secondary server may host the remainder of the participants of the conference event. Further, the master server may remove the secondary server when, for instance, the resource capacity of the master server is sufficient for the participants in the conference event.

In another embodiment, a master server may create a conference event for client devices and participants in one or more geographical region of the world. In one example, the master server may create a conference event for one or more geographic regions such as North America, South America, South East Asia, East Asia, Europe and Australia.

In another embodiment, the master server may include a computer program and a computer hardware system owned or operated by the host entity. Such master server may be operated about twenty-four hours a day, seven days a week to meet, for instance, some contiguous nominal demand for services. Further, the master server may initiate a secondary server as a computer program running on a third party's cloud-based server such as provided by Amazon.com® to offload, for instance, a peak demand for services or residual demand greater than some nominal demand for services handled by the master server. Such configuration allows for a more cost-effective solution by allowing the more cost-effective master server to be used to meet some nominal demand for services, while using the more cost-prohibitive secondary server to offload peak demand for services or residual demand greater than some nominal demand for services handled by the master server.

Furthermore, the master server may use one or more variables to determine when to re-assign one or more conference events or offload one or more client devices or one or more participants associated with a conference event to another master server or an active secondary server. Further, the master server may use the one or more variables to determine when to initiate a secondary server to host the conference event or offload one or more client devices or one or more participants associated with the conference event. The one or more variables may include, for instance, the capacity or the available capacity of each of the master servers or the active secondary servers, the expected capacity of a secondary server, the number of conference events hosted by each of the master servers or the active secondary servers, the number of client devices or participants actively coupled to each of the master servers or the active secondary servers, the number of client devices or participants currently attending or expected to attend the conference event, the type of conference event, the historical attendance of the conference event such as for conference events associated with a particular community, sponsor or presenter, another similar variable, or any combination thereof.

In addition, if there is a master server with sufficient capacity to host a conference event or to offload a portion of the client devices or participants associated with a conference event from another master server, then such conference event, client devices or participants may be assigned or reassigned to the master server. However, if the master server does not have sufficient capacity to host the conference event, then the master server may determine whether there is an active secondary server with sufficient capacity to host the conference event, client devices or participants. If there is an active secondary server with sufficient capacity to host the conference event, client devices or participants, then the master server may assign the secondary server to host the conference event, client devices or participants. However, if there is no secondary server available to host the conference event, client devices or participants, then the master server may launch a new secondary server with sufficient capacity to host the conference event, client devices or participants.

In another embodiment, one or more master servers may monitor their own capacity, as well as the capacity of one or more active secondary servers. The one or more master servers may determine that the one or more active secondary servers are not being used, the current or expected capacity of the one or more master servers is sufficient to fully or partially offload the capacity from the one or more active secondary servers, or the current or expected capacity of the one or more secondary servers allows for the consolidation of such capacity to fewer of the one or more secondary servers, at which point, the one or more master servers may remove the use of or shutdown the one or more active secondary servers.

In another embodiment, a secondary server may set a timer after the completion of its last conference event or the hosting of client devices or participants for another server's conference event. If the timer expires prior to the secondary server initiating another conference event or the hosting of client devices or participants for another server's conference event, then the secondary server may remove or shutdown itself. However, if another conference event or the hosting of client devices or participants for another server's conference event is initiated prior to the expiration of the timer, then the secondary server may reset the timer after the completion of its last conference event or the hosting of client devices or participants for another server's conference event.

In another embodiment, a master server may have a maintenance schedule that may require it to reboot itself after the expiration of a timer. Further, the master server may monitor its resource usage and may reboot itself based on its resource usage. In one example, the master server may determine that its memory usage is above a certain threshold at which point it determines to reboot itself.

In another embodiment, a secondary server may have a maintenance schedule that may require it to reboot itself after the expiration of a timer. Further, the secondary server may monitor its resource usage and may reboot itself based on its resource usage. In one example, the secondary server may determine that its memory usage is above a certain threshold at which point it determines to reboot or remove or shutdown itself.

In another embodiment, a master server may be configured to include an interest graph module to create, modify, remove, control, operate, analyze, manage or use an interest graph for one or more members of the community. In one definition, an interest graph may reflect specific or varied interests of a member of a community that may form the member's personal identity. The interest graph module of the master server may use the interest graph of the member to attempt to connect the member with other members of the community having the same or similar interests. For example, a member of a community may have an interest such as jogging, celebrity gossip, or animal rights, which may further define the member's likes and dislikes. The interest graph module of the master server may use one or more interests of the member to provide such member with other members of the community with the same or similar interests.

It is important to recognize that an interest graph is different from a social graph. An interest graph may be created, modified, removed, controlled, operated, analyzed, managed or used by the interest graph module of the master server to help a member form an interest-based relationship with another member of the community, wherein the member may not necessarily be familiar with the other member. Alternatively, a social graph may be created, modified, removed, controlled, operated, analyzed, managed or used by a social graph module of the master server to help a member form a social-based relationship with another member of the community. In one example, Facebook® has popularized the use of the social graph. Further, while a social graph may be used by the social graph module of the master server to identify a member's relationships with other members of a community, the interest graph may be used by the interest graph module of the master server to identify a member's personal preferences or characteristics. In addition, the interest graph module may use the interest graph to identify members who share the same interests, which may be dependent or independent of the social circles of each member.

The interest graph module of the master server may use explicitly declared interests by each member of the community such as the "Likes" on Facebook®, as well as implicit interests inferred from each member's on-line activities such as comments, photos and check-ins. In one example, the interest graph module of the master server may support the use of each member's interests to target third-party advertisements. In another example, the interest graph module of the master server may support the use of each member's interests to personalize content, perform audience analytics, or provide targeted marketing. In another example, the interest graph module of the master server may support the use of special offers or discounts on products and services based on each member's interests. In another example, the interest graph module of the master server may support the use of targeted advertisements based on each member's interests. In another example, the interest graph module of the master server may support the use of e-mail campaigns to reach members of a particular interest.

The interest graph module of the master server may be used to provide members with a targeted, personalized experience based on each member's interests. Further, the interest graph module of the master server may be used to connect members of the community having similar or the same interests. In addition, the interest graph module of the master server may be used to couple to remote web sites to gain access to additional explicit or implicit interests. For example, the interest graph module of the master server may be used to couple to a social music site to connect members with the same or similar taste in music via, for instance, playlists. In another example, the interest graph module of the master server may be used to couple to a blog or a questions and answer web site.

The interest graph module in combination with the social graph module of the master server may be used analyze and manage members of the community along multi-dimensional factors such as interests, social contacts, demographics, location, psychographics such as 'Likes,' friends, another factor, or any combination thereof. Further, the interest graph module in combination with the social graph module of the master server may use this information to form connections between members that have the same or similar characteristics. For example, the interest graph module in combination with the social graph module may be used to recommend a to a member another member of the community that has a similar interest. In another example, the interest graph module in combination with the social graph module may be used to recommend that two or more members of a community with similar or the same interests meet for coffee.

Figure 17:
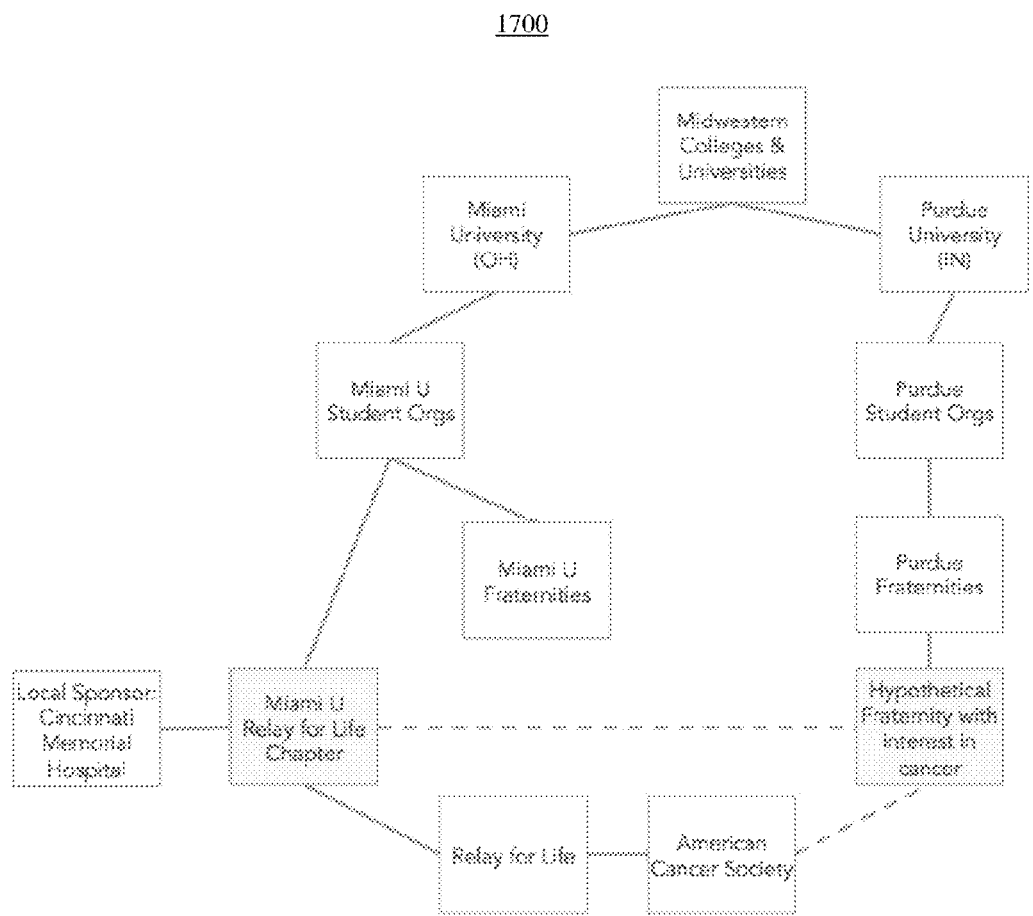
FIG. 17 illustrates an example of an interest graph.

FIG. 17 illustrates an example of an interest graph. In FIG. 17, the American Cancer Society may run a national fundraising event called Relay for Life. Various college campuses may host their own local Relay for Life events. Miami University may be one of them, among dozens of others. The Miami Relay for Life chapter may be connected to the American Cancer Society in a parent-child relationship, since it may be a chapter of the American Cancer Society's larger national body. The Miami Relay for Life chapter may be similarly connected to Miami University in a parent-child relationship, since it may be a student organization that rolls up to the governing body of Student Orgs at Miami University. The Miami Relay for Life chapter may be connected with other chapters like it at other schools, such as the Purdue or Northwestern Relay for Life chapters in a sibling relationship, since they are sister organizations working to accomplish the same thing at different locations. The Miami Relay for Life chapter may be connected to other student organizations at Miami University, such as fraternities and sororities, in a sibling relationship, because they roll up to the same parent. The Miami Relay for Life may be less connected, although still connected to other student organizations at other universities, such as fraternities at Purdue or Northwestern, because they have obvious commonalities. If a particular fraternity at Purdue decided to focus its philanthropic efforts on raising charitable contributions for cancer, then there may be an indirect connection with the Miami Relay for Life chapter. This may be the case if Purdue did not have a Relay for Life Chapter. If the Purdue fraternity wanted to acquire knowledge, advice, know how, best practices, experience, or other similar knowledge with regards to raise charitable contributions for cancer, then the Miami Relay for Life chapter may be a good connection to assist them, particularly since they have experience in the desired field.

Figure 18:
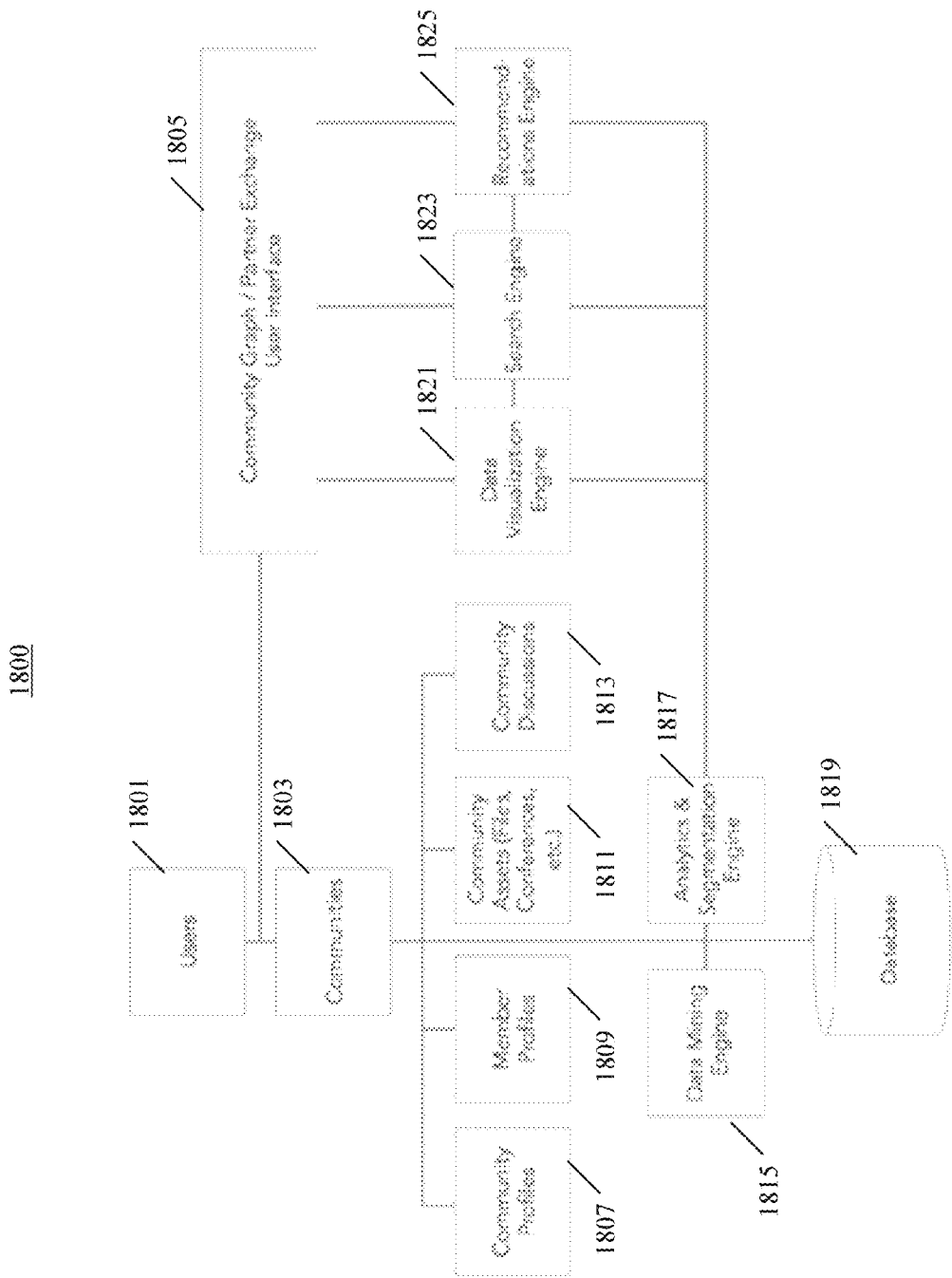
FIG. 18 illustrates one embodiment of a portion of a master server system in accordance with various aspects set forth herein.

FIG. 18 illustrates one embodiment of a portion of a master server system 1800 in accordance with various aspects set forth herein. In FIG. 18, the master server system 1800 may be configured to include a users module 1801, a communities module 1803, a community graph and partner exchange user interface module 1805. The community module 1803 may be configured to include a community profile module 1807, a member profile module 1809, a community asset module 1811, a community discussion module 1813, a data mining engine module 1815, an analytics and segmentation engine module 1817, and a database 1819. The community graph and partner exchange user interface module 1805 may be configured to include a data visualization engine module 1821, a search engine module 1823, a recommendations engine module 1825. On the back end, an engine has been built to enable connections between communities. Parent-child relationships are enabled by letting communities designate sub-communities underneath them such as Purdue>Purdue Student Orgs in FIG. 17. Sibling relationships may be enabled by community partnerships, where two or more communities may join all or a portion of their communities as partners to share resources, and in the graph, establish a relationship such as the local sponsor such as the Cincinnati Memorial Hospital relationship in FIG. 17. Inferences about cousins and other relationships with more than one degree of separation may be made by the master server system 1800, which may draw connections between various communities along a number of dimensions, including geographic such as region, city, state, climate or density of area; demographic such as age, sex, marital status, income, education or occupation; psychological such as needs, motivation, personality, perception, values, learning involvement or attitudes; psychographic such as lifestyle, values or status; socio-cultural such as cultures, religion, subcultures, social class or family lifecycle; use of products/services such as heavy vs. light users of a certain product or use or aware or loyal to a certain brand; use situation such as leisure, work, personal, at home, self, family members, manager, peers, another factor, or any combination thereof.

On the front end, the community graph and partner exchange user interface 1805 may be configured to enable browsing and discovery of other communities based on all of the various types of available connections. Further, the community graph and partner exchange user interface 1805 may be configured to enable communities to discover other communities that may be similar or may be able to assist them via collaboration, or may be complementary. The search engine module 1821 may provide intelligent searching using multiple variables such as location, interest, keywords. For example, in FIG. 17, a user may type a simple command or question phrase such as "College students in the Midwest who raise money for cancer," and successfully return the Miami U Relay for Life chapter, as well as other potential communities that exist. A community may be able to explicitly state in its profile key capabilities, knowledge, or resources that it may provide to or may be seeking from another community. Such capability may enhance the performance of the master server system 1800 and may enable communities to more easily connect with each other. The database 1819 may store information such as interests or attributes, and may allow for mining, reporting, or analytical analysis of such information.

In FIG. 18, the analytics and segmentation engine module 1817 may analyze or segment the database 1819 to identify interests or attributes of a community based on profile information such as a name, a community profile, a member profile, a photograph, an icon or other similar element. The data mining engine module 1815 may mine text, comments, conversations, video conferencing transcripts, files uploaded, or other similar information from one or more communities, and may identify various explicit or inferred interests or attributes of the one or more communities. The community profiling engine module 1807 may determine values for the various dimensions and maps preferences and associations for each community. In one example, the community profiling engine module 1807 may rank the various interests and attributes on a scale from, for instance, zero (0) to ten (10). The data visualization engine module 1821 may graphically depict the output for each community as a result of all mapping, and may draw connections between other communities based on actual connections such as community partnerships, and inferred connections such as those based on common interests along the dimensions stated above, and degrees of separation, as depicted in FIG. 17. The search engine module 1823 may include filtering, keyword search, or other similar features to allow searching all or any portion of the information contained in the master server system 1800. The recommendations engine 1825 may provide recommendations of other communities that a given community should consider for potential partnership, based on the stated and/or inferred interests of said communities Although the present disclosure describes specific examples, embodiments, and the like, various modifications and changes can be made without departing from the scope of the present disclosure as set forth in the claims below. For example, although the exemplary methods, devices, and systems described herein are in conjunction with a configuration for the aforementioned social networking systems, the skilled artisan will readily recognize that the exemplary methods, devices, and systems may be used in other methods, devices, and systems and may be configured to correspond to such other exemplary methods, devices, and systems as needed. Further, while at least one embodiment has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims.

What is claimed is:

1. A computer-implemented method, comprising:
creating a conference event having a start time and associated with a community;
registering attendees of the conference event;
authenticating each of the attendees of the conference event as a member of the community;
determining a number of attendees of the conference event; and
in response to determining that a processing capacity of a master server is not sufficient to host the number of the attendees of the conference event and prior to the start time of the conference event, initiating a secondary server that is operatively coupled to the master server and assigning a first portion of the attendees of the conference event to the master server and a second portion of the attendees of the conference event to the secondary server.

2. The method of claim 1, further comprising:
identifying that the capacity of the master server is sufficient to host the conference event; and
re-assigning the second portion of the attendees assigned to the secondary server to the master server.

3. The method of claim 2, further comprising:
in response to identifying that the capacity of the master server is sufficient for hosting the conference event and to re-assigning the second portion of the attendees to the master server, removing the secondary server.

4. The method of claim 1, wherein hosting the first portion of the attendees includes establishing, by the master server, communications with client devices associated with the first portion of the attendees.

5. The method of claim 1, wherein the conference event includes real-time, multipoint conferencing.

6. The method of claim 1, further comprising:
at the start time of the conference event, hosting, by the secondary server, the second portion of the attendees of the conference event.

7. The method of claim 1, further comprising:
in response to assigning, hosting, by the secondary server, the second portion of the attendees of the conference event.

8. The method of claim 7, further comprising:
establishing, by the secondary server, communications with client devices associated with the second portion of the attendees of the conference event.

9. The method of claim 1, further comprising:
at the start time of the conference event, hosting, by the master server, the first portion of the attendees of the conference event.

10. A system, comprising:
a master server, wherein the master server includes:
an event creation module configured to:
create a conference event having a start time and associated with a community; and
register attendees of the conference event;
an authentication module configured to:
authenticate each of the attendees of the conference event as a member of the community;
a host module configured to:
determine a number of the attendees of the conference event;
in response to determining that a processing capacity of the master server is not sufficient to host the number of the attendees of the conference event and prior to the start time of the conference event, initiate a secondary server that is operatively coupled to the master server and assign a first portion of the attendees of the conference event to the master server and a second portion of the attendees of the conference event to the secondary server; and
at the start time of the conference event, host the first portion of the attendees of the conference event.

11. The system of claim 10, wherein the master server further includes:
a community module configured to:
merge the community with another community.

12. The system of claim 10, wherein the master server further includes:
a contact module configured to manage a contact of the community.

13. The system of claim 10, wherein the master server further includes:
a social circle module configured to manage a social circle of the community; and
an authentication module configured to allow a member of another community to have access to the social circle of the community.

14. The system of claim 10, wherein the master server further includes:
a content feed module configured to manage the conference event of the community.

15. The system of claim 10, wherein the conference event includes real-time, multipoint conferencing.

16. The system of claim 10, further comprising:
the secondary server, wherein the secondary server is configured to:
in response to assigning the second portion of the attendees of the conference event to the secondary server and at the start time of the conference event, host the second portion of the attendees of the conference event.

17. A non-transitory computer-readable medium encoded with a computer program, the computer program comprising computer-executable instructions that when executed by a processor causes the processor to perform operations, wherein the operations are configured to:
create a conference event having a start time and associated with a community;
register attendees of the conference event;
authenticate each of the attendees as a member of the community;
determine a number of the attendees of the conference event;
in response to determining that a processing capacity of the master server is not sufficient to host the number of the attendees of the conference event and prior to the start time of the conference event, initiate a secondary server that is operatively coupled to the master server and assign a first portion of the attendees of the conference event to the master server and a second portion of the attendees of the conference event to the secondary server; and
at the start time of the conference event, host the first portion of the attendees of the conference event.

18. The computer-readable medium of claim 17, wherein the operations are further configured to:

merge the community with another community.

19. The computer-readable medium of claim 17, wherein the operations are further configured to:

authenticate a member of another community to allow the member of the other community to have access to the conference event of the community.

20. The computer-readable medium of claim 17, wherein the conference event includes real-time, multipoint conferencing.

\* \* \* \* \*